(12) United States Patent (10) Patent No.: US 7,533,197 B2
Leonard et al. (45) Date of Patent: May 12, 2009

(54) SYSTEM AND METHOD FOR REMOTE DIRECT MEMORY ACCESS WITHOUT PAGE LOCKING BY THE OPERATING SYSTEM

(75) Inventors: Judson S. Leonard, Newton, MA (US); David Gingold, Somerville, MA (US); Lawrence C. Stewart, Wayland, MA (US)

(73) Assignee: SiCortex, Inc., Maynard, MA (US)

( * ) Notice: Subject to any disclaimer, the term of this patent is extended or adjusted under 35 U.S.C. 154(b) by 62 days.

(21) Appl. No.: 11/594,446

(22) Filed: Nov. 8, 2006

(65) Prior Publication Data

US 2008/0109570 A1 May 8, 2008

(51) Int. Cl.
*G06F 13/28* (2006.01)
*G06F 15/167* (2006.01)
(52) U.S. Cl. .............................. 710/22; 710/23; 710/24; 709/212
(58) Field of Classification Search .................... 710/22, 710/23, 24, 212; 712/212
See application file for complete search history.

(56) References Cited

U.S. PATENT DOCUMENTS

| | | | |
|---|---|---|---|
| 5,887,134 A | | 3/1999 | Ebrahim |
| 6,321,276 B1* | | 11/2001 | Forin .............................. 710/3 |
| 2004/0078631 A1* | | 4/2004 | Rogers et al. ................... 714/5 |
| 2006/0045109 A1 | | 3/2006 | Blackmore et al. |
| 2007/0198806 A1* | | 8/2007 | Schultz ........................ 711/203 |
| 2008/0005297 A1* | | 1/2008 | Kjos et al. ................... 709/223 |
| 2008/0005529 A1* | | 1/2008 | Morris ........................ 711/207 |

OTHER PUBLICATIONS

International Search Report and Written Opinion, International Patent Application No. PCT/US07/82869, mailed Jul. 3, 2008 ( 9 pages).
Bell, C. and Bonachea, D. "A new DMA registration strategy for pinning-based high performance networks." Workshop on Communication Architecture for Clusters (CAC'03).
Chen, Y. et al. "UTLB: A mechanism for address translation on network interfaces." Architectural Support for Programming Languages and Operating Systems (1998) 193-204.
Magoutis, K. "Design and Implementation of a direct access file system (DAFS) kernel server for FreeBSD" Proceedings of BSDCon 2002 Conference. San Francisco, CA. (2002) (13 pgs).

(Continued)

*Primary Examiner*—Niketa I Patel
(74) *Attorney, Agent, or Firm*—Chapin IP Law, LLC; Barry W. Chapin, Esq.

(57) ABSTRACT

A multi-node computer system with a plurality of interconnected processing nodes, including a method of using DMA engines without page locking by the operating system. The method includes a sending node with a first virtual address space and a receiving node with a second virtual address space. Performing a DMA data transfer operation between the first virtual address space on the sending node and the second virtual address space on the receiving node via a DMA engine, and if the DMA operation refers to a virtual address within the second virtual address space that is not in physical memory, causing the DMA operation to fail. The method includes causing the receiving node to map the referenced virtual address within the second virtual address space to a physical address, and causing the sending node to retry the DMA operation, wherein the retried DMA operation is performed without page locking.

6 Claims, 23 Drawing Sheets

OTHER PUBLICATIONS

Magoutis, K. "The optimistic direct access file system: Design and network interface support." Workshop on Novel Uses of System Area Networks (SAN-1) (2002) (12 pgs).

Magoutis, K. "Making the most out of direct-access network attached storage." Proceedings of FAST'03: 2nd USENIX Conference on File and Storage Technologies. San Francisco, CA (2003) (15 pgs).

Schoinas, L., Hill, M.D. "Address translation mechanisms in network interfaces." HPCA (1998) 219-230.

Tezuka, H. et al. "Pin-down cache: A virtual memory management technique for zero-copy communication." Proceedings of the 12th International Parallel Processing Symposium. (1998) 308-315.

Woodall, T.S. et al. "High performance RDMA protocols in HPC" Proceedings, 13th European PVM/MPI Users' Group Meeting. Lecture Notes in Computer Science, Bonn, Germany, Springer-Velag (2006) (11 pgs).

* cited by examiner

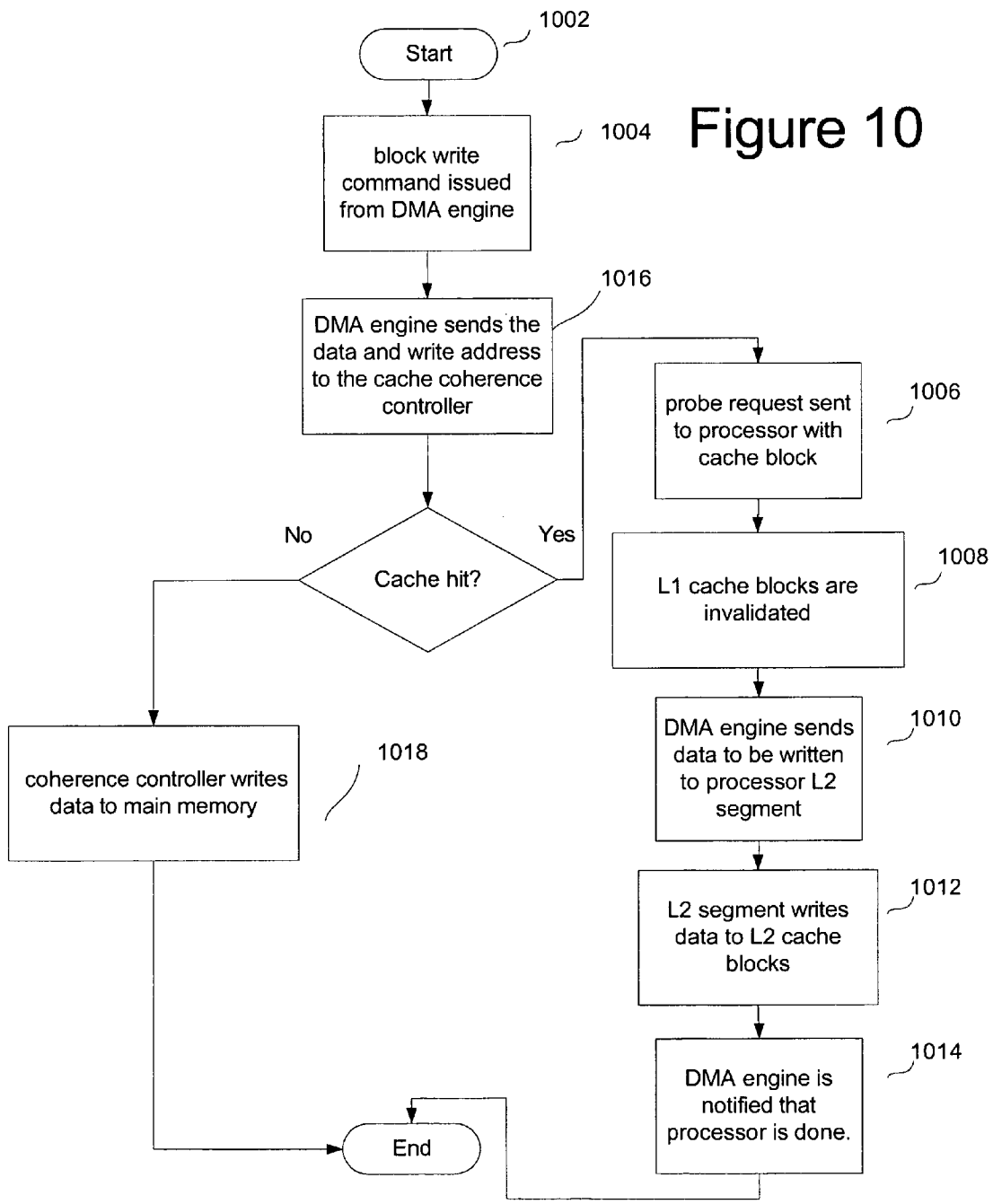

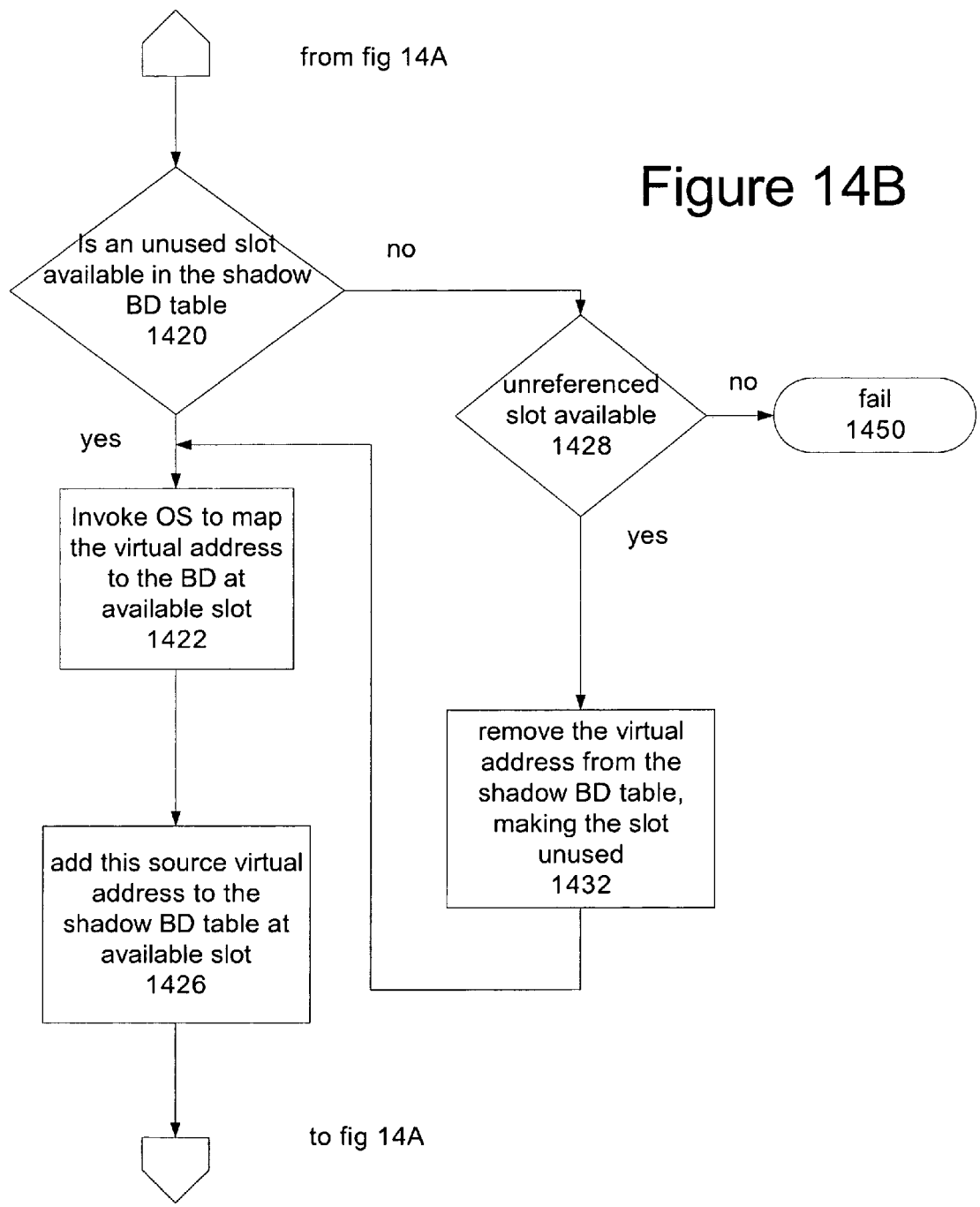

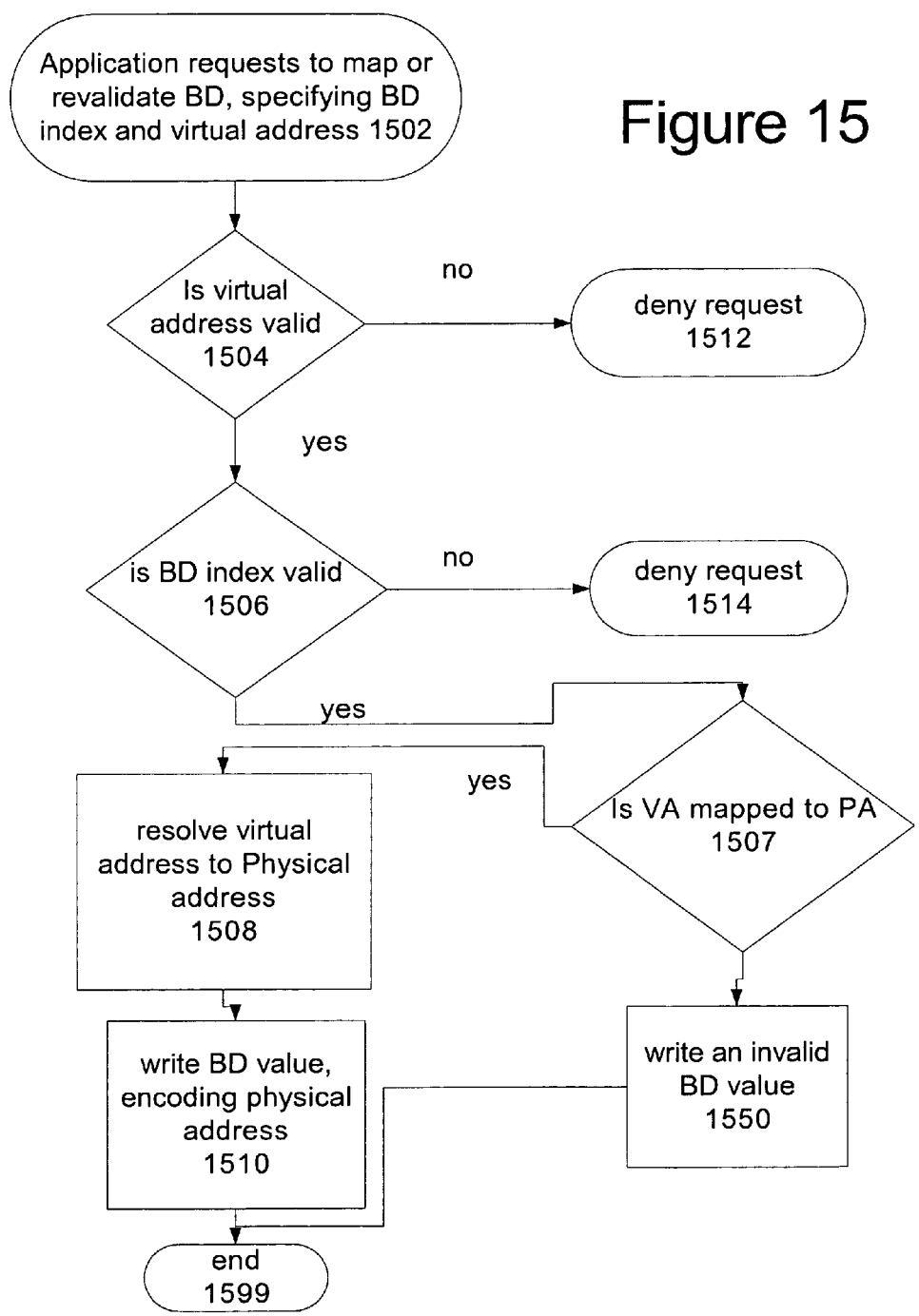

SYSTEM AND METHOD FOR REMOTE DIRECT MEMORY ACCESS WITHOUT PAGE LOCKING BY THE OPERATING SYSTEM

CROSS-REFERENCE TO RELATED APPLICATIONS

This application is related to the following U.S. patent applications, the contents of which are incorporated herein in their entirety by reference:

U.S. patent application Ser. No. 11/335,421, filed Jan. 19, 2006, entitled SYSTEM AND METHOD OF MULTI-CORE CACHE COHERENCY;

U.S. patent application Ser. No. 11/594,416, filed on an even date herewith, entitled COMPUTER SYSTEM AND METHOD USING EFFICIENT MODULE AND BACKPLANE TILING TO INTERCONNECT COMPUTER NODES VIA A KAUTZ-LIKE DIGRAPH;

U.S. patent application Ser. No. 11/594,426, filed on an even date herewith, entitled SYSTEM AND METHOD FOR PREVENTING DEADLOCK IN RICHLY-CONNECTED MULTI-PROCESSOR COMPUTER SYSTEM USING DYNAMIC ASSIGNMENT OF VIRTUAL CHANNELS;

U.S. patent application Ser. No. 11/594,421, filed on an even date herewith, entitled LARGE SCALE MULTI-PROCESSOR SYSTEM WITH A LINK-LEVEL INTERCONNECT PROVIDING IN-ORDER PACKET DELIVERY;

U.S. patent application Ser No. 11/594,442, filed on an even date herewith, entitled MESOCHRONOUS CLOCK SYSTEM AND METHOD TO MINIMIZE LATENCY AND BUFFER REQUIREMENTS FOR DATA TRANSFER IN A LARGE MULTI-PROCESSOR COMPUTING SYSTEM;

U.S. patent application Ser. No. 11/594,423, filed on an even date herewith, entitled COMPUTER SYSTEM AND METHOD USING A KAUTZ-LIKE DIGRAPH TO INTERCONNECT COMPUTER NODES AND HAVING CONTROL BACK CHANNEL BETWEEN NODES;

U.S. patent application Ser. No. 11/594,420, filed on an even date herewith, entitled SYSTEM AND METHOD FOR ARBITRATION FOR VIRTUAL CHANNELS TO PREVENT LIVELOCK IN A RICHLY-CONNECTED MULTI-PROCESSOR COMPUTER SYSTEM;

U.S. patent application Ser. No. 11/594,441, filed on an even date herewith, entitled LARGE SCALE COMPUTING SYSTEM WITH MULTI-LANE MESOCHRONOUS DATA TRANSFERS AMONG COMPUTER NODES;

U.S. patent application Ser. No. 11/594,405, filed on an even date herewith, entitled SYSTEM AND METHOD FOR COMMUNICATING ON A RICHLY CONNECTED MULTI-PROCESSOR COMPUTER SYSTEM USING A POOL OF BUFFERS FOR DYNAMIC ASSOCIATION WITH A VIRTUAL CHANNEL;

U.S. patent application Ser. No. 11/594,443, filed on an even date herewith, entitled RDMA SYSTEMS AND METHODS FOR SENDING COMMANDS FROM A SOURCE NODE TO A TARGET NODE FOR LOCAL EXECUTION OF COMMANDS AT THE TARGET NODE;

U.S. patent application Ser. No. 11/594,447, filed on an even date herewith, entitled SYSTEMS AND METHODS FOR REMOTE DIRECT MEMORY ACCESS TO PROCESSOR CACHES FOR RDMA READS AND WRITES; and U.S. patent application Ser. No. 11/594,427, filed on an even date herewith, entitled REMOTE DMA SYSTEMS AND METHODS FOR SUPPORTING SYNCHRONIZATION OF DISTRIBUTED PROCESSES IN A MULTI-PROCESSOR SYSTEM USING COLLECTIVE OPERATIONS.

BACKGROUND OF THE INVENTION

1. Field of the Invention

The invention relates to remote direct memory access (RDMA) systems and, more specifically, to RDMA systems that support synchronization of distributed processes in a large scale multiprocessor system.

2. Description of the Related Art

Distributed processing involves multiple tasks on one or more computers interacting in some coordinated way to act as an "application". For example, the distributed application may subdivide a problem into pieces or tasks, and it may dedicate specific computers to execute the specific pieces or tasks. The tasks will need to synchronize their activities on occasion so that they may operate as a coordinated whole.

In the art (e.g., message passing interface standard), "collective operations," "barrier operations" and "reduction operations," among others, have been used to facilitate synchronization or coordination among processes. These operations are typically performed in operating system library routines, and can require a large amount of involvement from the processor and kernel level software to perform. Details of the message passing interface can be found in "MPI—The Complete Reference", 2nd edition, published by the MIT press, which is herein incorporated by reference.

Processes within an application generally need to share data with one another. RDMA techniques have been proposed in which one computer may directly transfer data from its memory into the memory system of another computer. These RDMA techniques off-load much of the processing from the operating system software to the RDMA network interface hardware (NICs). See Infiniband Architecture Specification, Vol. 1, copyright Oct. 24, 2000 by the Infiniband Trade Association. Processes running on a computer node may post commands to a command queue in memory, and the RDMA engine will retrieve and execute commands from the queue.

SUMMARY OF THE INVENTION

The invention provides systems and methods for remote direct memory access without page locking by the operating system.

Under one aspect of the invention, a multi-node computer system has a plurality of interconnected processing nodes. DMA engines are used in a way to avoid page locking. A DMA operation is performed between a first virtual address and a second virtual address space via a DMA engine. When performing the DMA operation, it is determined whether the DMA operation refers to a virtual address that is present in physical memory. If the DMA operation refers to a virtual address that is not in physical memory, the DMA operation is caused to fail and the node maps the referenced virtual address to a physical address. The DMA sender or receiver is caused to retry the DMA operation.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements:

FIG. 10 is a flow diagram of a block write;

FIGS. 14A-C depict a logic flow for preferred embodiments in which RDMA send operations avoid page pinning;

FIG. 15 depicts the operating system logic for mapping or re-validating a BD of certain embodiments.

DETAILED DESCRIPTION OF EMBODIMENTS OF THE INVENTION

Preferred embodiments of the invention provide an RDMA engine that facilitates distributed processing in large scale computing systems and the like. The RDMA engine includes queues for processing DMA data requests for sending data to and from other computing nodes, allowing data to be read from or written to user memory space. The engine also includes command queues, which can receive and process commands from the operating system or applications on the local node or from other computer nodes. The command queues can receive and process (with hardware support) special commands to facilitate collective operations, including barrier and reduction operations, and special commands to support the conditional execution of a set of commands associated with the special command. These features facilitate synchronization and coordination among distributed tasks. As one example, when all children tasks in a distributed application have reached a synchronization point in their execution, they can issue a special command to a particular DMA engine (master); the master will conditionally execute a set of other commands associated with that special command based on the number of children which are participating in the synchronization. This set of other commands may be used to inform parent tasks of such execution status by the children tasks, or may be used for other purposes. This coordination can be hierarchically distributed to increase the achievable parallelism.

Certain embodiments of the invention provide RDMA engines that interact with processor cache to service RDMA reads and writes. The cache may be read to provide data for a RDMA operation. Likewise, the cache may be written to service a RDMA operation. By directly involving the cache (and not invalidating the entries and just using main memory), latency is reduced for processor memory requests.

Other embodiments of the invention provide RDMA transfers that do not use (or incure the overhead of) page locking by a node's operating system. Instead transfers are made with the expectation that the relevant pages will be in the memory system, and if they're not, the transfer will be re-tried. This approach reduces the overhead of the transaction.

Kautz Topologies

Certain embodiments of the invention are utilized on a large scale multiprocessor computer system in which computer processing nodes are interconnected in a Kautz interconnection topology. Kautz interconnection topologies are unidirectional, directed graphs (digraphs). Kautz digraphs are characterized by a degree k and a diameter n. The degree of the digraph is the maximum number of arcs (or links or edges) input to or output from any node. The diameter is the maximum number of arcs that must be traversed from any node to any other node in the topology.

The order O of a graph is the number of nodes it contains. The order of a Kautz digraph is $(k+1)k^{n-1}$. The diameter of a Kautz digraph increases logarithmically with the order of the graph.

Figure 1:
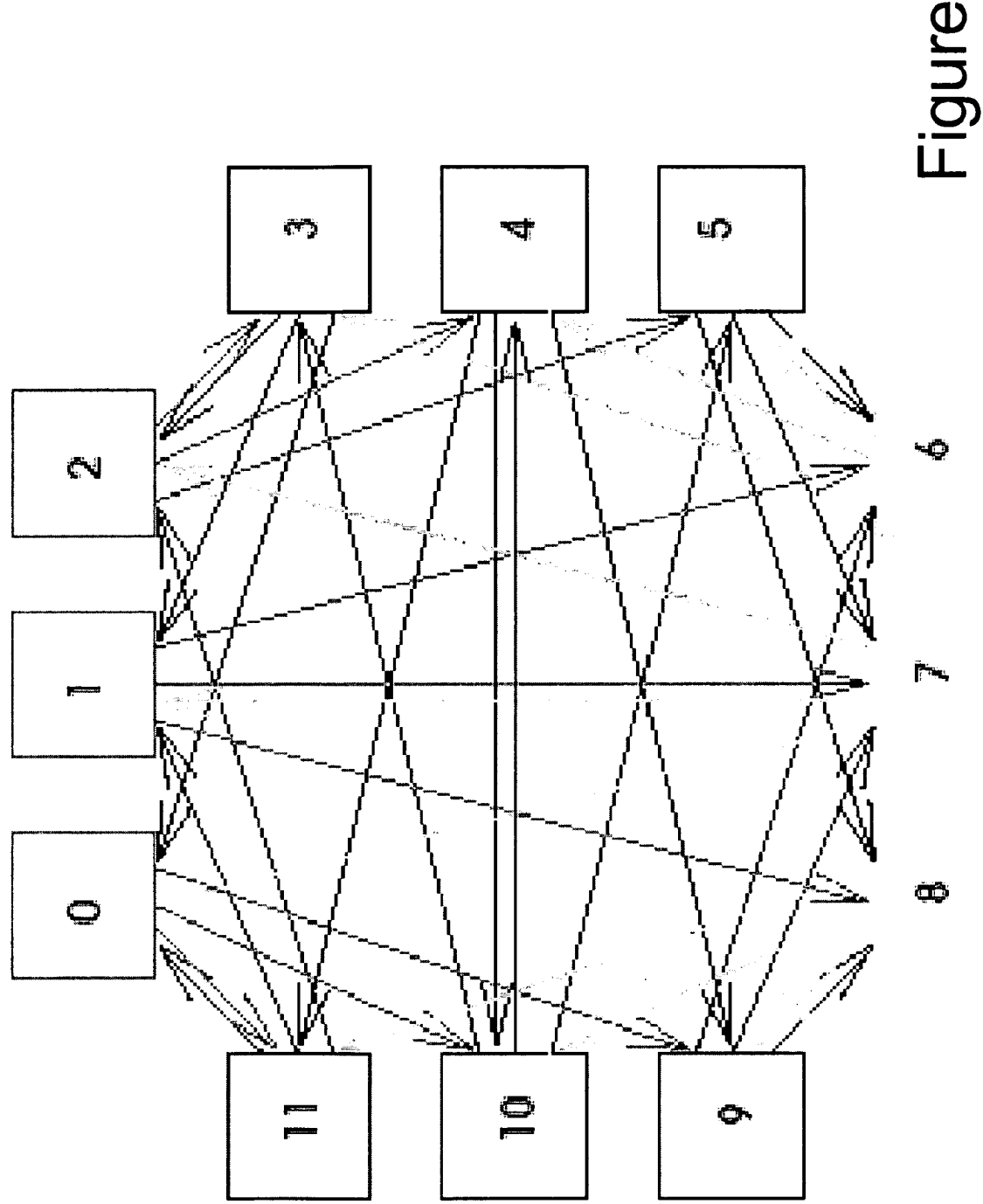
FIG. 1 is an exemplary Kautz topology.
Figure 2:
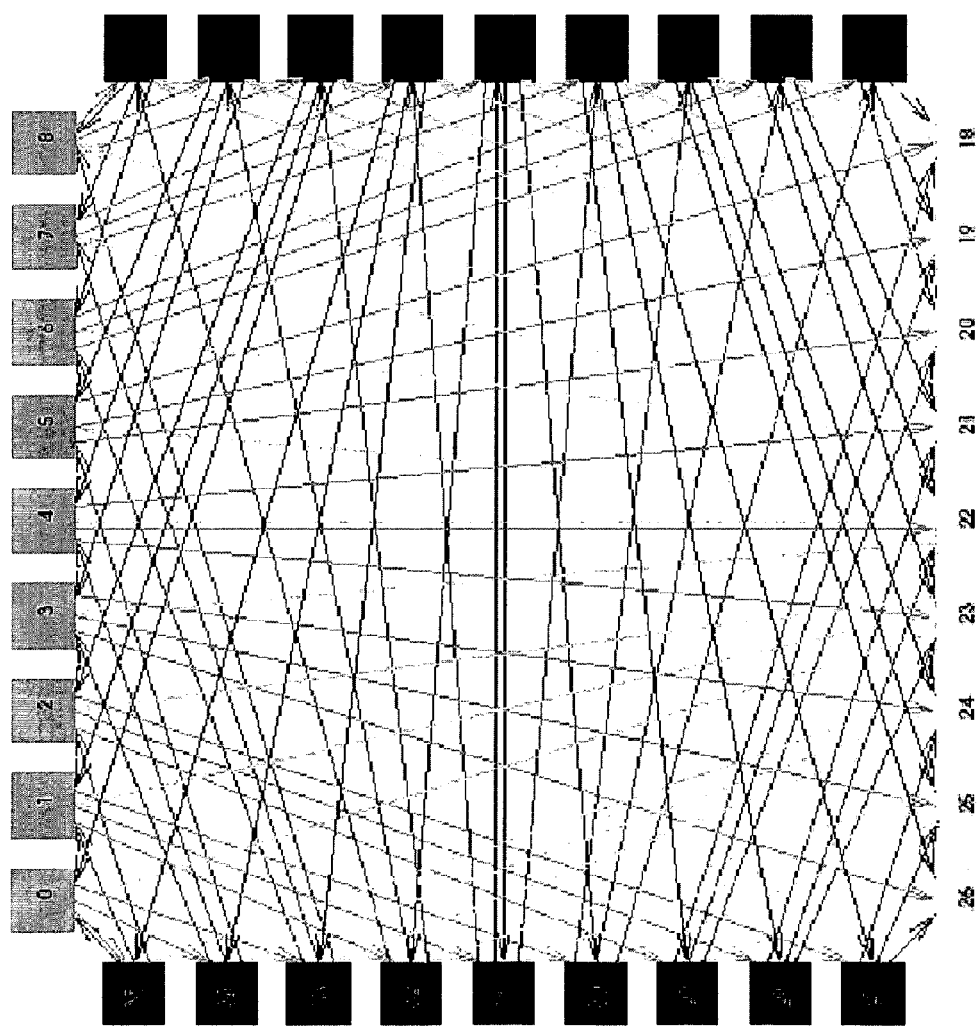
FIG. 2 is an exemplary simple Kautz topology.

FIG. 1 depicts a very simple Kautz topology for descriptive convenience. The system is order 12 and diameter 2. By inspection, one can verify that any node can communicate with any other node in a maximum of 2 hops. FIG. 2 shows a system that is degree three, diameter three, order 36. One quickly sees that the complexity of the system grows quickly. It would be counter-productive to depict and describe preferred systems such as those having hundreds of nodes or more.

The table below shows how the order O of a system changes as the diameter n grows for a system of fixed degree k.

| | Order | | |
| Diameter (n) | k = 2 | k = 3 | k = 4 |
| --- | --- | --- | --- |
| 3 | 12 | 36 | 80 |
| 4 | 24 | 108 | 320 |
| 5 | 48 | 324 | 1280 |
| 6 | 96 | 972 | 5120 |

With the nodes numbered from zero to O−1, the digraph can be constructed by running a link from any node x to any other node y that satisfies the following equation:

$$y = (-x*k-j) \bmod O, \text{ where } 1 \leq j \leq k \quad (1)$$

Thus, any (x,y) pair satisfying (1) specifies a direct egress link from node x. For example, with reference to FIG. 2, node 1 has egress links to the set of nodes 30, 31 and 32. Iterating through this procedure for all nodes in the system will yield the interconnections, links, arcs or edges needed to satisfy the Kautz topology. (As stated above, communication between two arbitrarily selected nodes may require multiple hops through the topology but the number of hops is bounded by the diameter of the topology.)

Each node on the system may communicate with any other node on the system by appropriately routing messages onto the communication fabric via an egress link. Moreover, node to node transfers may be multi-lane mesochronous data transfers using 8B/10B codes. Under certain embodiments, any data message on the fabric includes routing information in the header of the message (among other information). The routing information specifies the entire route of the message. In certain degree three embodiments, the routing information is a bit string of 2-bit routing codes, each routing code specifying whether a message should be received locally (i.e., this is the target node of the message) or identifying one of three egress links. Naturally other topologies may be implemented with different routing codes and with different structures and methods under the principles of the invention.

Under certain embodiments, each node has tables programmed with the routing information. For a given node x to communicate with another node z, node x accesses the table and receives a bit string for the routing information. As will be explained below, this bit string is used to control various switches along the message's route to node z, in effect specifying which link to utilize at each node during the route. Another node j may have a different bit string when it needs to communicate with node z, because it will employ a different route to node z and the message may utilize different links at the various nodes in its route to node z. Thus, under certain embodiments, the routing information is not literally an "address" (i.e., it doesn't uniquely identify node z) but instead is a set of codes to control switches for the message's route. The incorporated patent applications describe preferred Kautz topologies and tilings in more detail.

Under certain embodiments, the routes are determined a priori based on the interconnectivity of the Kautz topology as expressed in equation 1. That is, the Kautz topology is defined, and the various egress links for each node are assigned a code (i.e., each link being one of three egress links). Thus, the exact routes for a message from node x to node y are known in advance, and the egress link selections may be determined in advance as well. These link selections are programmed as the routing information. This routing is described in more detail in the related and incorporated patent applications, for example, the application entitled "Computer System and Method Using a Kautz-like Digraph to interconnect Computer Nodes and having Control Back Channel between nodes," which is incorporated by reference into this application.

RDMA Transfers

Figure 3:
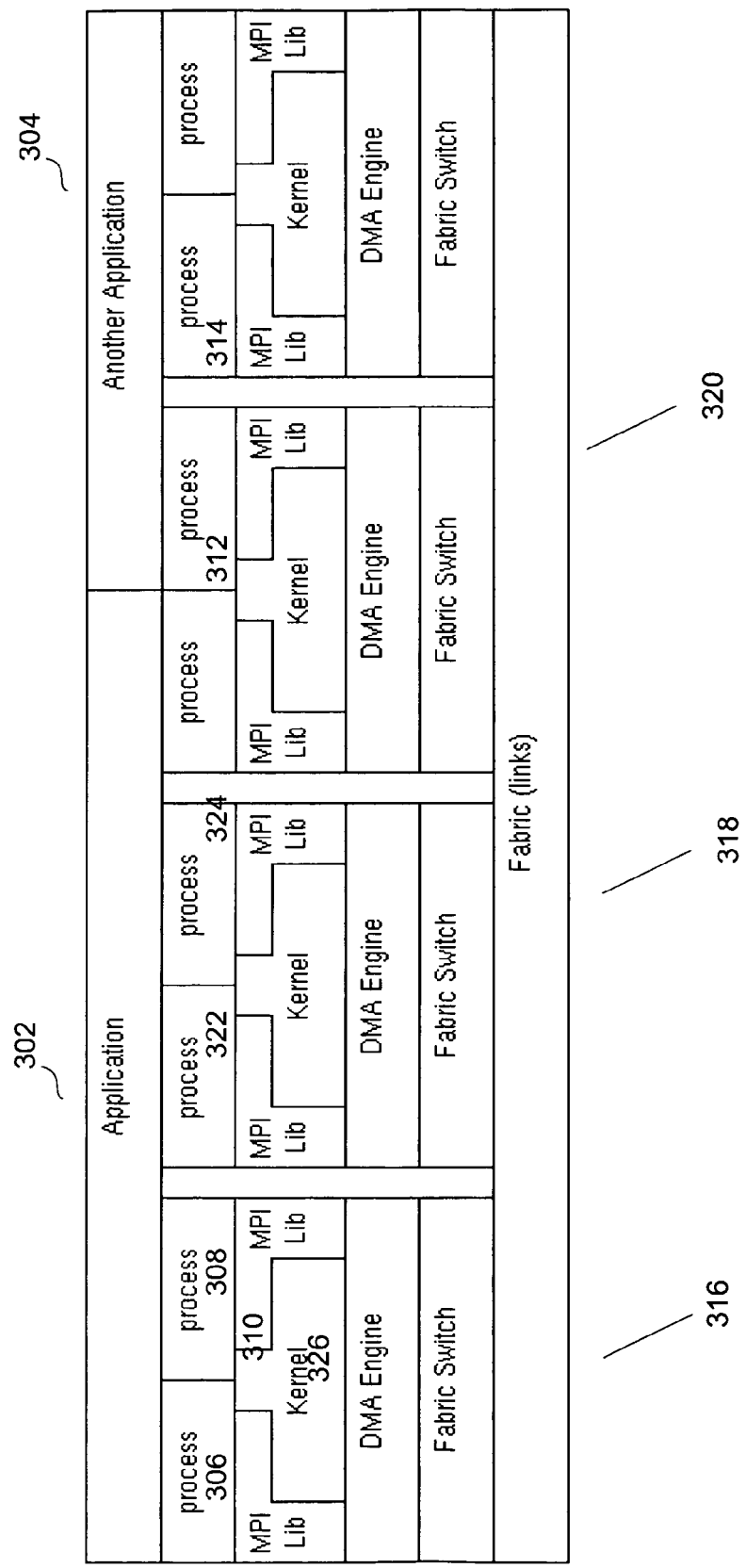
FIG. 3 shows a hierarchical view of the system.

FIG. 3 is a conceptual drawing to illustrate a distributed application. It shows an application 302 distributed across three nodes 316, 318, and 320 (each depicted by a communication stack). The application 302 is made up of multiple processes 306, 308, 322, 324, and 312. Some of these processes, for example, processes 306 and 308, run on a single node; other processes, e.g., 312, share a node, e.g., 320, with other processes, e.g., 314. The DMA engine interfaces with processes 306 and 308 (user level software) directly or through kernel level software 326.

Figure 4:
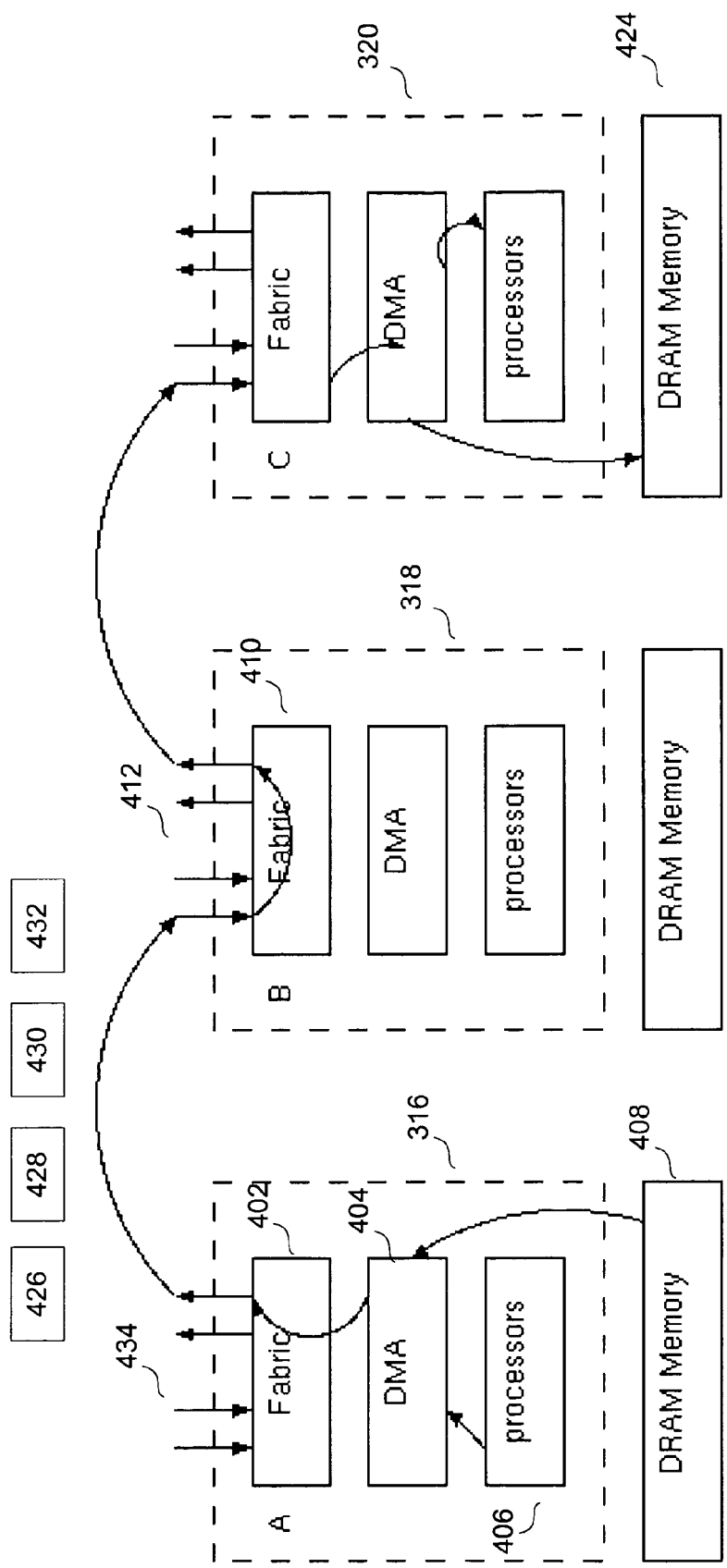
FIG. 4 is a diagram of the communication between nodes.

FIG. 4 depicts an exemplary information flow for a RDMA transfer of a message from a sending node 316 to a receiving node 320. This kind of RDMA transfer may be a result of message passing between processes executing on nodes 316 and 320, as suggested in FIG. 3. Because of the interconnection topology of the computer system (see above example of Kautz interconnections), node 316 is not directly connected to node 320, and thus the message has to be delivered through other node(s) (i.e., node 318) in the interconnection topology.

Each node 316, 318, and 320 has a main memory, respectively, 408, 426, and 424. A process 306 of application 302 running on node 316 may want to send a message to process 312 of the same application running on a remote node 320. This would mean moving data from memory 408 of node 316 to memory 424 of node 320.

To send this message, processor 406 sends a command to its local DMA engine 404. The DMA engine 404 interprets the command and requests the required data from the memory system 408. The DMA engine 404 builds packets 426-432 to contain the message. The packets 426-432 are then transferred to the link logic 402, for transmission on the fabric links 434. The packets 426-432 are routed to the destination node 320 through other nodes, such as node 318, if necessary. In this example, the link logic at node 318 will analyze the packets and realize that the packets are not intended for local consumption and instead that they should be forwarded along on its fabric links 412 connected to node 320. The link logic 418 at node 320 will realize that the packets are intended for local consumption, and the message will be handled by node 320's DMA engine 420. The communications from node 316 to 318, and from node 318 to 320, are each link level transmissions. The transmissions from node A 316 to C 320 are network level transmissions.

Figure 5:
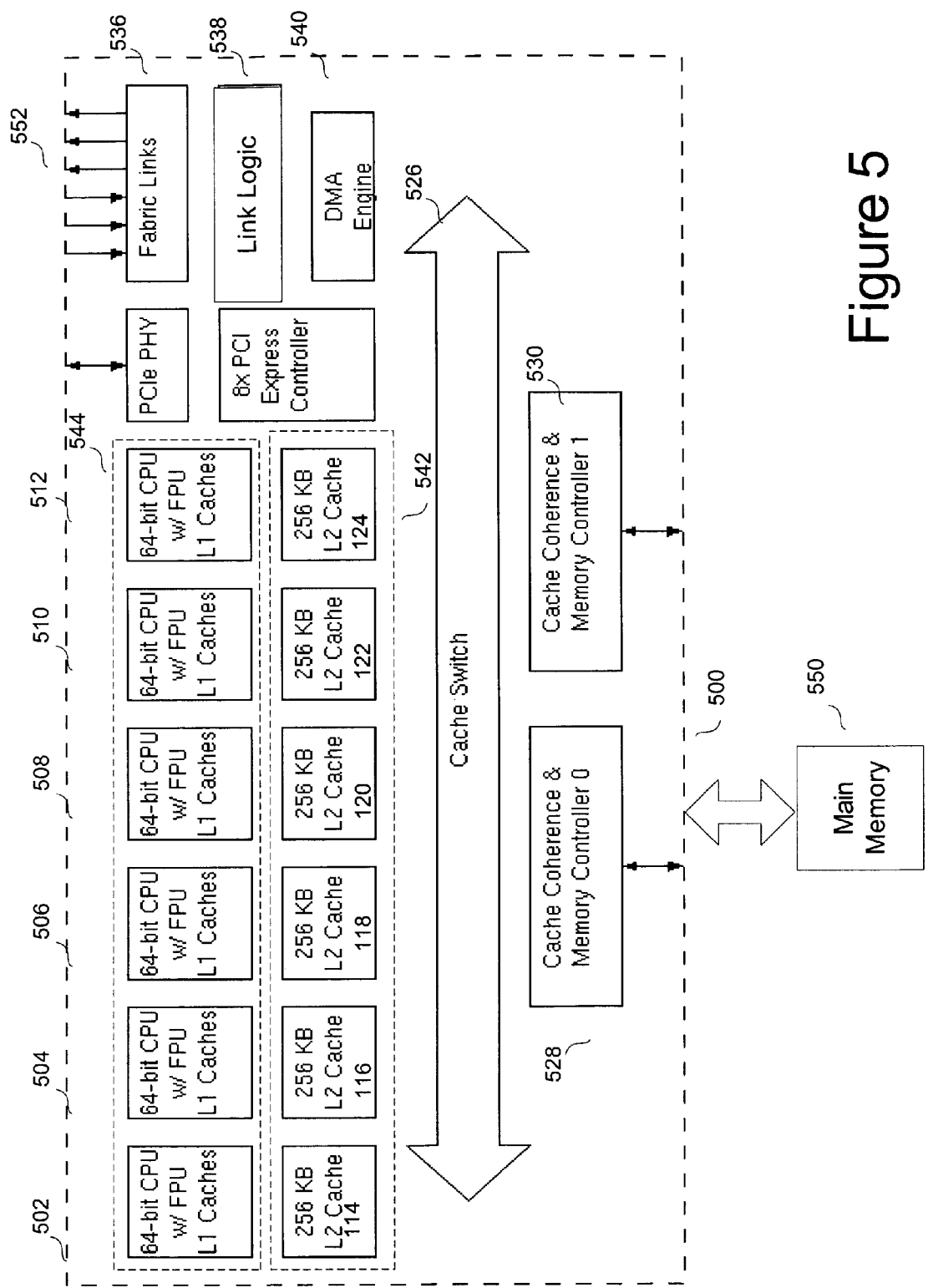
FIG. 5 shows an overview of the node and the DMA engine.

FIG. 5 depicts the architecture of a single node according to certain embodiments of the invention. A large scale multiprocessor system may incorporate many thousands of such nodes interconnected in a predefined topology. Node 500 has six processors 502, 504, 506, 508, 510, and 512. Each processor has a Level 1 cache (grouped as 544) and Level 2 cache (grouped as 542). The node also has main memory 550, cache switch 526, cache coherence and memory controllers 528 and 530, DMA engine 540, link logic 538, and input and output links 536. The input and output links are 8 bits wide (8 lanes) with a serializer and deserializer at each end. Each link also has a 1 bit wide control link for conveying control information from a receiver to a transmitter. Data on the links is encoded using an 8B/10B code.

Architecture of the DMA Engine

Figure 6:
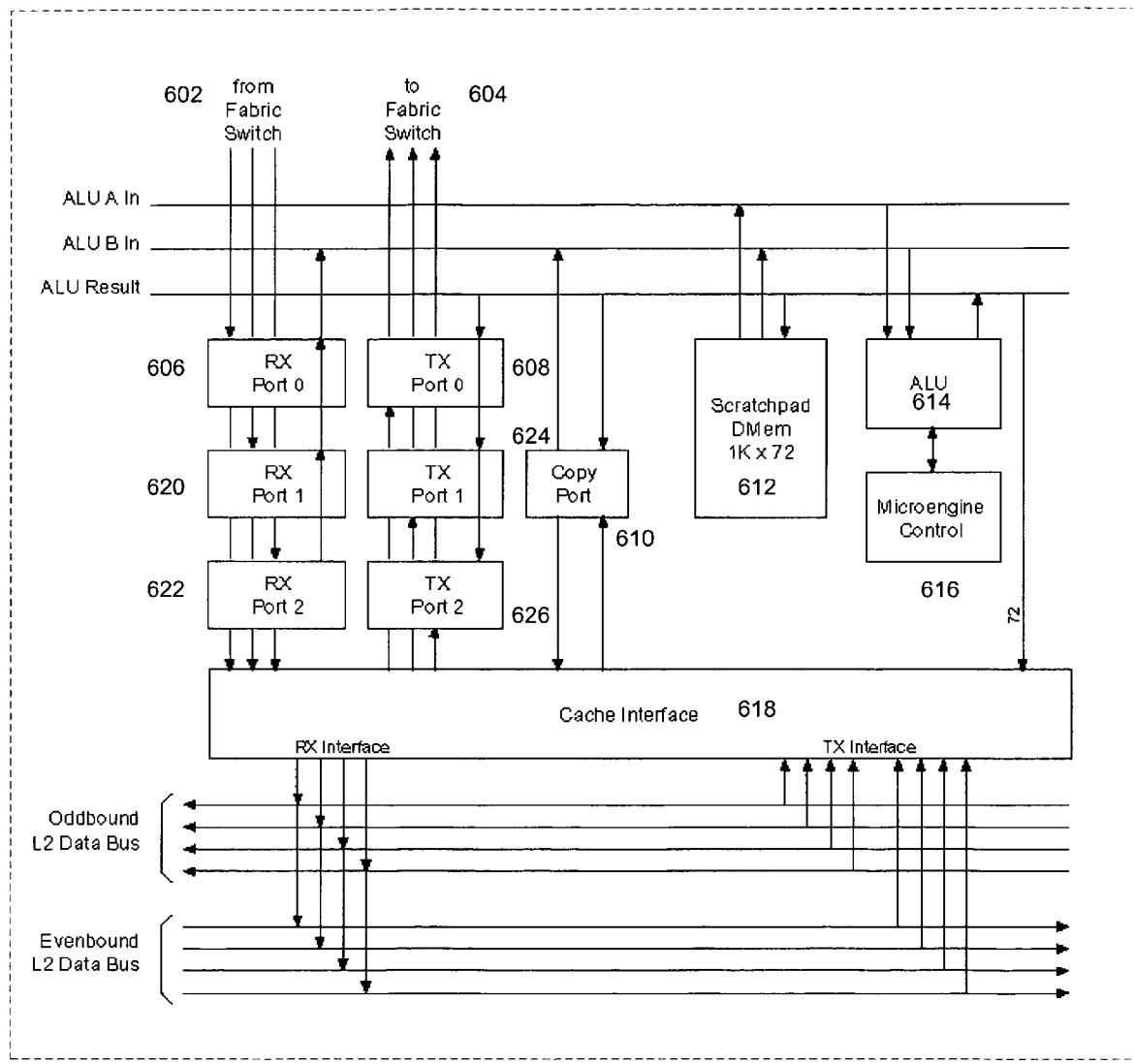
FIG. 6 is a detailed block diagram of the DMA engine.

FIG. 6 shows the architecture of the DMA engine 540 for certain embodiments of the invention. The DMA engine has input 602 and output 604 data buses to the switch logic (see FIGS. 3 and 4). There are three input buses and three output buses, allowing the DMA to support concurrent transfers on all ports of a Kautz topology of degree 3. The DMA engine also has three corresponding receive ports 606, 620, and 622 and three corresponding transmit ports 608, 624, and 626, corresponding to each of the three input 602 and output buses 604. The DMA engine also has a copy port 610 for local DMA transfers, a microengine 616 for controlling operation of the DMA engine, an ALU 614, and a scratchpad memory 612 used by the DMA engine. Finally, the DMA engine has a cache interface 618 for interfacing with the cache switch 526 (see FIG. 5).

The DMA engine 616 is a multi-threaded programmable controller that manages the transmit and receive ports. Cache interface 618 provides an interface for transfers to and from both L2 cache 542 and main memory (528 and 530) on behalf of the microengine. In other embodiments the DMA engine can be implemented completely in hardware, or completely within software that runs on a dedicated processor, or a processor also running application processes.

Scratchpad memory DMem 612 is used to hold operands for use by the microengine, as well as a register file that holds control and status information for each process and transmit context. The process context includes a process ID, a set of counters (more below), and a command quota. It also includes pointers to event queues, heap storage, command queues for the DMA engine, a route descriptor table, and a buffer descriptor table (BDT). The scratchpad memory 612 can be read and written by the microengine 616, and it is also accessible to processors 544 via I/O reads and writes.

The RX and TX ports are controlled by the microengine 616, but the ports include logic to perform the corresponding data copying to and from the links and node memory (via cache interface 618). Each of the transmit 608 and receive ports 606 contains packet buffers, state machines, and address sequencers so that they can transfer data to and from the link logic 538, using buses 602 and 604, without needing the microengine for the data transfer.

The copy port 610 is used to send packets from one process to another within the same node. The copy port is designed to act like a transmit or receive port, so that library software can treat local (within the node) and remote packet transfers in a similar way. The copy port can also be used to perform traditional memory-to-memory copies between cooperating processes.

When receiving packets from the fabric links, the DMA engine 540 stores the packets within a buffer in the receive port, e.g., 606, before they are moved to main memory or otherwise handled. For example, if a packet enters the DMA engine on RX Port 0 with the final destination being that node, then the packet is stored in "RX Port 0" until the DMA engine processes the packet. Each RX port can hold up to four such packets at a time, before it signals backpressure to the fabric switch not to send any more data.

The DMA engine is notified of arriving packets by a signal from the receive port in which the packet was buffered. This signal wakes up a corresponding thread in the DMA microengine 616, so that the microengine can examine the packet and take appropriate action. Usually the microengine will decide to copy the packet to main memory at a particular address, and start a block transfer. The cache interface 618 and receive port logic implement the block transfer without any further interaction with the microengine. The packet buffer is then empty to be used by another packet.

Transmission of packets from the DMA engine to the link logic 538 is done in a similar manner. Data is transferred from main memory to the DMA engine, where it is packetized within a transmit port. For example, this could be TX 608, if the packet was destined for transmission on the fabric link corresponding to port 0. The microengine signals the transmit port, which then sends the packet out to the link logic 538 and recycles the packet buffer.

Interface to the DMA Engine

Figure 8:
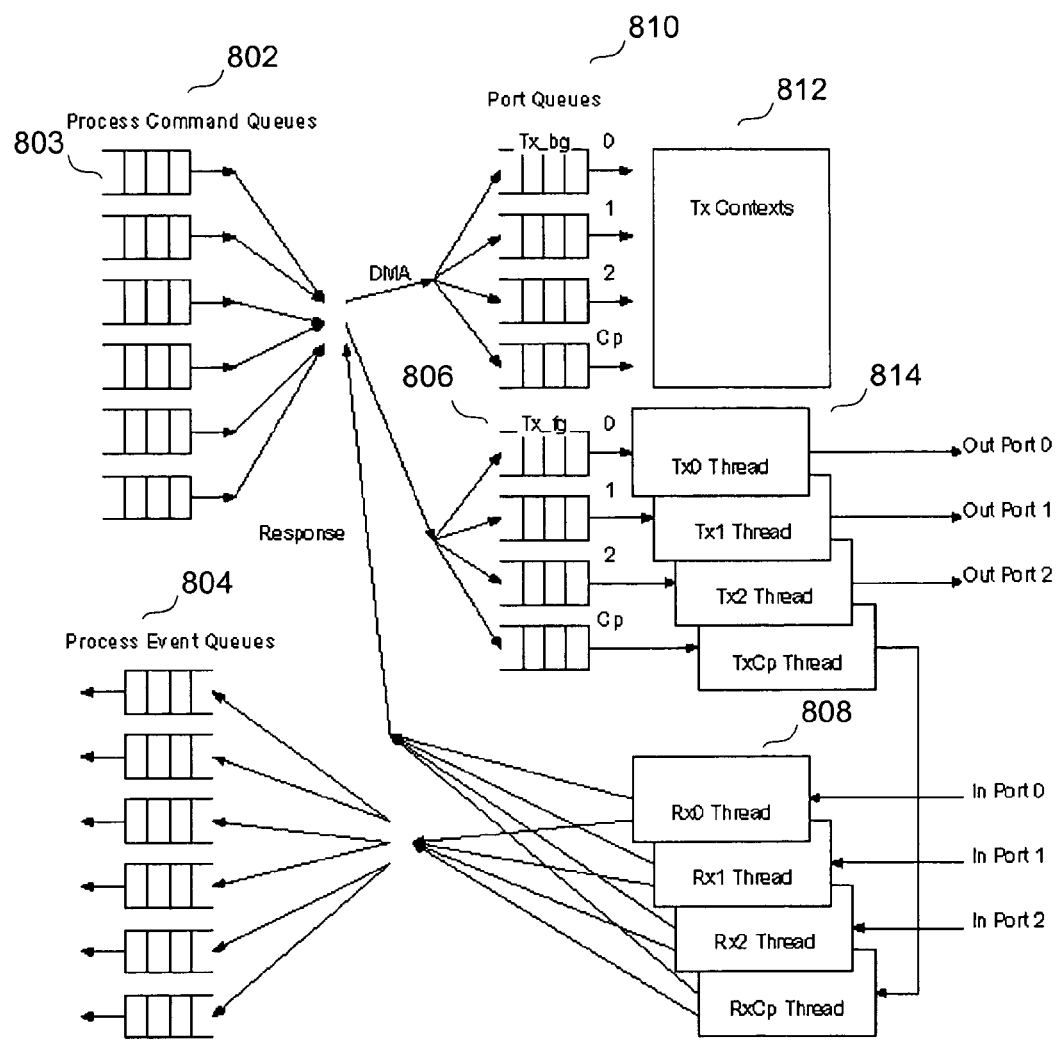
FIG. 8 is a block diagram of the role of the queue manager and various queues.

FIG. 8 depicts the interface to a DMA engine 540 for certain embodiments of the invention. The interface includes, among other things, command queues, event queues and relevant microengine threads for handling and managing queues and ports. User-level processes communicate with DMA Engine 540 by placing commands in a region of main memory 550 dedicated to holding command queues 802.

Each command queue 803 is described by a set of three values accessible to the kernel.

1. The memory region used for a queue is described by a buffer descriptor.

2. The read pointer is the physical address of the next item to be removed from the queue (the head of the queue).

3. The write pointer is the physical address at which the next item should be inserted in the queue (tail).

The read and write pointers are incremented by 128 bytes until the memory reaches the end of the region, then it wraps to the beginning. Various microcoded functions within the DMA engine, such as, the queue manager can manage the pointers.

The port queues 810 are queues where commands can be placed to be processed by a transmit context 812 or transmit thread 814 of a TX port 608. They are port, nor process, specific.

The event queue 804 is a user accessible region of memory that is used by the DMA engine to notify user-level processes about the completion of DMA commands or about errors. Event queues may also be used for relatively short messages between nodes.

The engine 616 includes a thread called the queue manager (not shown). The queue manager monitors each of the process queues 803 (one for each process), and copies commands placed there by processes to port queues 810 and 806 for processing. The queue manager also handles placing events on process event queues 804.

To use the DMA engine interface, a process writes entries onto a command queue 803, and then signals the queue manager using a special I/O register. The queue manger reads entries from the command queue region 802, checks the entry for errors, and then copies the entry to a port command queue 806 or 810 for execution. (The queue manager can either immediately process the command, or copy it to a port command queue for later processing.) Completion of a transfer is signaled by storing onto the event queue, and optionally by executing a string of additional commands.

Each process has a quota of the maximum number of commands it may have on a port queue. This quota is stored within the scratchpad memory 612. Any command in excess of the quota is left on a process's individual command queue 803, and processing of commands on that command queue is suspended until earlier commands have been completed.

Transmit contexts 812 may be used to facilitate larger DMA transfers. A transmit context 812 is stored within the scratchpad memory 612 and is used to describe an outgoing transfer. It includes the sequence of packets, the memory buffer from which the packets are to be read, and the destination (a route, and a receive context ID). The DMA engine 540 may manage 8 contexts, one background and foreground context for each output link, and a pair for interprocess messages on the local node.

Transmit contexts are maintained in the each node. This facilitates the transmission and interpretation of packets. For example, transmit context information may be loaded from the scratchpad memory 612 to a TX or RX port by a transmit thread under the control of engine 616.

Routing of Messages

Route descriptors are used to describe routes through the topology to route messages from one node to another node. Route descriptors are stored in a route descriptor table, and are accessible thorough handles. A table of route descriptors is stored in main memory, although the DMA engine 540 can cache the most commonly used ones in scratchpad memory 612. Each process has a register within scratchpad memory 612 representing the starting physical address and length of the route descriptor table (RDT) for that process.

Each RDT entry contains routing directions, a virtual channel number, a processID on the destination node, and a hardware process index, which identifies the location within the scratchpad memory 612 where the process control/status information is stored for the destination process. The Route Descriptor also contains a 2-bit field identifying the output port associated with a path, so that a command can be stored on the appropriate transmit port queue.

The routing directions are described by a string of routing instructions, one per switch, indicating the output port to use on that switch. After selecting the output, each switch shifts the routing direction right two bits, discarding one instruction and exposing the next for use at the next switch. At the destination node, the routing code will be a value indicating that the node is the destination node.

DMA Commands

The DMA engine is capable of executing various commands. Examples of these commands are
- send_event command,
- send_cmd command,
- do_cmd command,
- put_bf_bf command,
- put_im_hp command, and
- supervise command.
- a get command (based on the put_bf_bf and send_cmd commands)

Every command has a command header. The header includes the length of the payload, the type of command, a route handle, and in do_cmd commands, a do_cmd counter selector, and a do_cmd counter reset value.

The send_event command instructs the DMA engine to create and send an enq_direct packet whose payload will be stored on the event queue of the destination process. The destination process can be at a remote node. For example a command from engine 404 of FIG. 4 can be stored on the event queue for DMA engine 420. This enables one form of communication between remote processes. The details of the packets are described below.

The send_cmd command instructs the DMA engine to create an enq_Response packet, with a payload to be processed as a command at the destination node. The send_cmd command contains a nested command as its payload. The nested command will be interpreted at the remote node as if it had been issued by the receiving process at the remote node (i.e., as if it had been issued locally). The nested command should not be a send_cmd or supervise command. As will be described below, the DMA engine will place the payload of the send_cmd command on a port command queue of the receiving DMA engine for execution, just as if it were a local DMA command. If the receiving process does not have enough quota, then the command will be deferred; placed on the process's event queue instead.

The do_cmd instructs a DMA engine to conditionally execute a string of commands found in the heap. The heap is a region of memory within the main memory, which is user-writable and contiguous in both virtual and physical memory address spaces. Objects on the heap are referred to by handles. The fields of the do_cmd command are the countId field (register id), the countTotal (the count reset value) field, the execHandle (heap handle for the first command) field, and the execCount (number of bytes in the command string) field. There are 16-4 bit registers in the scratchpad memory 612, associated with each process, that are used to store a value for a counter. The do_cmd countID field identifies one of these 16 registers within the DMA engine. If the register value is 0 when the do_cmd is executed, the value of the register is replaced by the countTotal field, and commands specified by the execHandle are enqueued for execution by the DMA engine. The do_cmd cannot be used to enqueue another do_cmd for execution.

A do_cmd is executed by selecting the counter identified by the countID field, comparing the value against zero, and decrementing the counter if it is not equal to zero. Once the value reaches zero, the DMA engine uses the execHandle and execCount field to identify and execute a string of commands found on the heap.

The put_bf_bf command instructs the DMA engine to create and send a sequence of DMA packets to a remote node using a transmit context. The packet payload is located at a location referred to by a buffer handle, which identifies a buffer descriptor in the BDT, and an offset, which indicates the starting address within the region described by the buffer descriptor. The put_bf_bf commands waits on the background port queues 810 for the availability of a transmit context. Offset fields within the command specify the starting byte address of the destination and source buffers with respect to buffer descriptors. The DMA engine creates packets using the data referred to by the source buffer handle and offset, and sends out packets addressed to the destination buffer handle and offset.

The put_bf_bf command can also be used to allow a node to request data from the DMA engine of a remote node. The put_bf_bf command and the send_cmd can be used together to operate as a "get" command. A node uses the send_cmd to send a put_bf_bf command to a remote node. The target of where the DMA packets are sent by the put_bf_bf command is the node that sent the put_bf_bf command. This results in a "get" command. Further details of packets and embedding commands within a send_cmd are described below.

The put_im_hp command instructs the DMA engine to send a packet to the remote node. The payload comes from the command itself, and it is written to the heap of the remote node.

The supervise command provides control mechanisms for the management of the DMA engine.

Packets

Packets are used to send messages from one node to another node. Packets are made up of a 8 byte packet header, an optional 8 byte control word, a packet body of 8 to 128 bytes, and an 8 byte packet trailer. The first 8 bytes of every data packet, called the header word, includes a routing string, a virtual channel number, a buffer index for the next node, and a link sequence number for error recovery, as well as a non-data start of packet (SOP) flag. The second 8 bytes, called the control word, is optional (depending on the type of packet) and is interpreted by the receiving DMA engine to control where and how the payload is stored. The last 8 bytes, the trailer, includes the packet type, a 20-bit identification code for the target process at the destination node, a CRC checksum, and a non-data end of packet (EOP) flag, used to mark the end of the packet.

An enq_direct packet is used to send short messages of one or a few packets. The payload of such a message if deposited on the event queue of another process. This type of packet has only an 8 byte header (no control word) and an 8 byte trailer.

An enq_response packet is created by a node to contain a command to be executed by a remote node. The remote node places the payload of the packet, which is a command, onto a port command queue for execution by the DMA engine.

DMA packets are used to carry high volume traffic between cooperating nodes that have set up transmit and receive contexts. DMA packets have the same headers and trailers as other packets, but also have an 8 byte control word containing a buffer handle, and offset, which tell the receiving DMA engine where to store the data.

A DMA_end packet is sent by a node to signal the end of a successful transmission. It has enough information for the receiving DMA engine to store an event on the event queue of the receiving process, and if request by the sender, to execute a string of additional commands found in the receiver's heap.

Execution of a DMA Command Issued from Another Node's RDMA Engine

Certain embodiments of the invention allow one node to issue a command to be executed by another node's RDMA engine. These embodiments establish a "trust system" among processes and nodes. Only trusted processes will be able to use RDMA. In one embodiment of the invention, the trust model is that an application, which may consist of user processes on many nodes, trusts all its own processes and the operating system, but does not trust other applications. Similarly, the operating system trusts the OS on other nodes, but does not trust any application.

Trust relationships are established by the operating system (OS). The operating system establishes route descriptor tables in memory. A process needs the RDTs to access the routing information that allows it to send commands that will be accepted and trusted at a remote node. Each process has a register within scratchpad memory 612, representing the starting physical address and length of the route descriptor table for that process. This allows the process to access the route descriptor table.

When a process creates a command header for a command it places the route handle of the destination node and process in the header. The DMA engine uses this handle to access the RDT to obtain (among other things) a processID and hardware process index of the destination process. This information is placed into the packet trailer.

When a remote DMA engine receives a packet, it uses the hardware process index to retrieve the corresponding control/status information from scratchpad memory 612. As described above, this contains a processID of the destination process. The DMA engine compares the processID stored in the local DMA engine with the processID in the packet trailer. If the values do not match, the incoming packet is sent to the event queue of process 0 for exception handling. If they do match, the DMA engine processes the packet normally.

Figure 7:
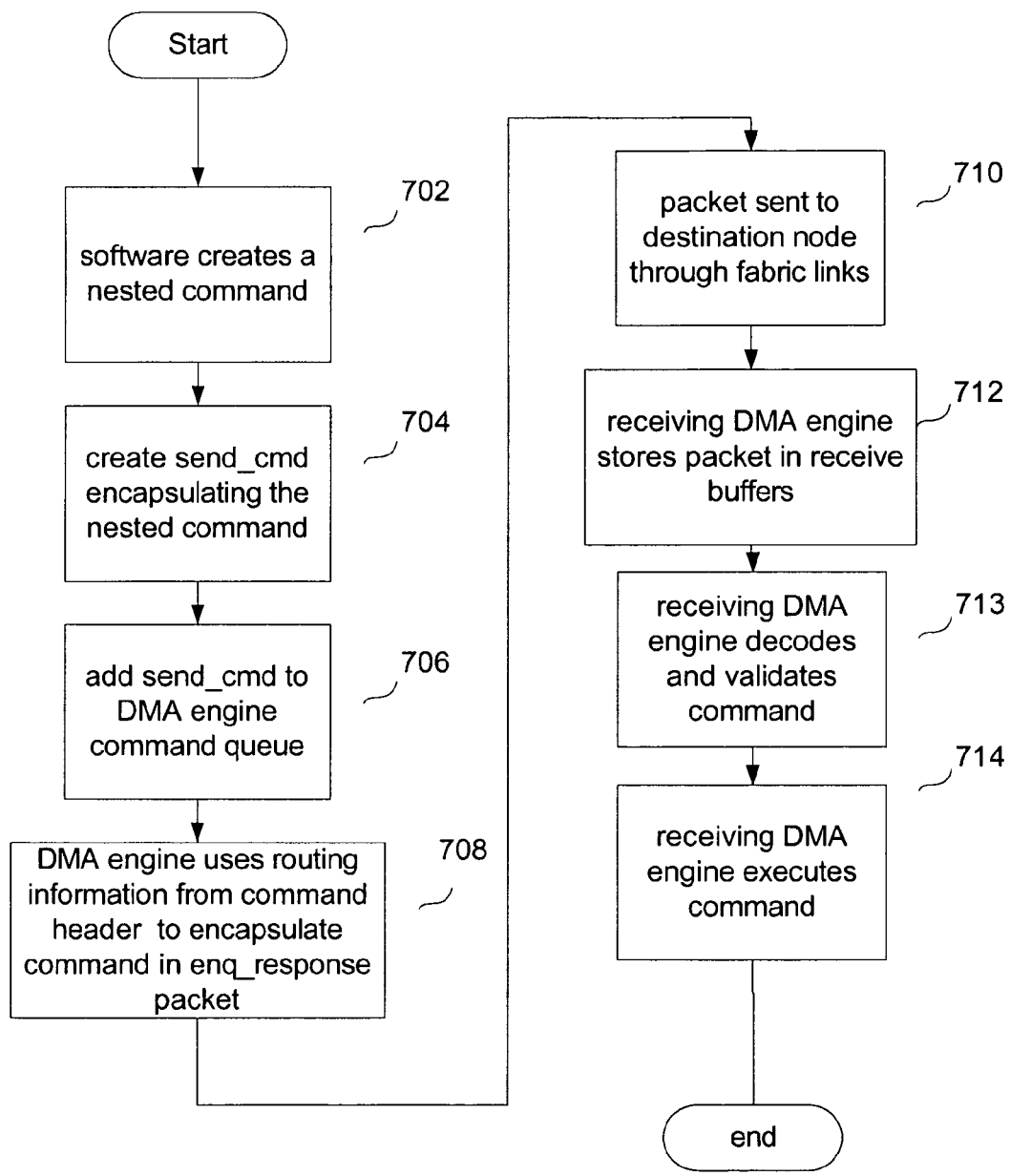
FIG. 7 is a flow diagram of the remote execution of DMA commands.

FIG. 7 depicts the logic flow for sending a command to a DMA engine at a remote node for execution of the command by that DMA engine. The process begins with step 702, where a nested command is created. As described above, a nested command is one or more commands to be captured as a payload of a send_cmd. The nested command is one command which is sent as the payload of a send_cmd. The process constructs the nested command following the structure for a command header, and the structure of the desired command as described above.

At step 704, a send_cmd is created, following the format for a send command and the command header format. The nested command is used as the payload of the send_cmd.

At step 706, the send_cmd (with the nested command payload) is posted to a command queue for the DMA engine. Eventually, the queue manager of the DMA engine copies the command to a port queue 806 or 810 for processing.

At step 708, the DMA engine interprets the send_cmd. The DMA engine looks up routing information based on a route handle in the command header which points to a routing table entry. The DMA engine builds an enq_response packet. The payload of that packet is loaded with the payload of the send_cmd (i.e., the nested command). The DMA engine also builds the necessary packet header and trailer based on the routing table entry. Specifically, this trailers contain the proper processID and hardware process index to be trusted by the remote DMA engine.

At step 710, the DMA engine copies the enq_response packet to the port queue of the link to be used for transmission. The TX port then retrieves the packet and hands it off to the link logic 538 and switching fabric 552. The link logic will handle actual transmission of the packet on the switching fabric. (The microengine can determine the correct port queue by looking at the routing information in the header of the enq_response packet.)

The packet will be sent through the interconnect topology until it reaches the destination node.

At step 712, the packet arrives at the destination link logic on the corresponding receive port, where is it forwarded to the corresponding RX port buffer within the DMA engine of the remote node's DMA engine. The RX port notifies the DMA microengine, as it does with any other packet it receives.

At step 713, the DMA engine determines that the packet type is an enq_response packet. Before placing the command on a port command queue of the corresponding process, the packet is validated. This process, as described above, compares the processID of the destination process to the processID stored in the packet trailer of the enq_response packet. If the processIDs match, the packet is trusted, and the payload of the packet is stored to a command queue of the receiving process for execution. This command is processed in essentially the same way as if the command has been enqueued by the local process having the same processID. If there is a not a match, then an event is added to process 0's event queue so that the sender can be notified of the error.

At step 714, the command is eventually selected by the DMA engine and executed by the DMA engine (at the remote node). This execution is done in the context of the receiving node's RDT and BDT.

If a packet is received for a process which has already reached its quota for the number of commands that process can have on the command queue, then the packet is deferred to the event queue for that process. This allows the process to reschedule it. Command queue quotas for each process are maintained within the DMA engine. If the event queue is full, the packet is discarded. It is up to the user-level processes to ensure that command or event queues do not become too full.

Barrier Operations and Synchronization

Preferred embodiments of the invention utilize the remote command execution feature discussed above in a specific way to support collective operations, such as barrier and reduction operations. Barrier operations are used to synchronize the activity of processes in a distributed application. (Collective operations and barrier operations are known in the art, e.g., MPI, but are conventionally implemented in operating system and MPI software executed by the processor.) One well known method is using hierarchical trees for synchronization.

In accordance with one embodiment of the invention, barrier operations may be implemented by using the do_cmd described above, which provides for the conditional execution of a set of other instructions or commands. By way of example, one node in the set of nodes associated with a distributed application is selected to act as a master node. The specific form of selection is application dependent, and there may be multiple masters in certain arrangements, e.g., hierarchical arrangements. A list of commands is then created to be associated with the do command and to be conditionally executed as described below. The commands may be stored on the heap storage of the master node. A counter register to be used by the synchronization process is initialized by use of an earlier do_cmd that has a countTotal field set to one less than the number of processes that will be involved in the barrier operation. This is because each do_cmd tests if the counter value is equal to zero before it decrements the counter. Therefore if 3 processes are involved, the counter is initialized to 2, and the first do_cmd will reduce the counter value to 1, the second counter value will reduce the counter value to 0, and the third do_cmd will find that the value is zero.

Each process of the distributed application will include a call to a library routine to issue the do command to the master node, at an application-dependent synchronization point of execution. That node/application will send a do_cmd to the master node in the manner described above for sending DMA commands to another node for execution. The do_cmd will cause the relevant counter to be selected and decremented. The last process to reach the barrier operation will send the final do_cmd. When the DMA engine executes this do_cmd, the counter value will be equal to zero and this will cause the DMA engine to execute the DMA commands on the heap associated with the do_cmd (i.e., those pointed to by the execHandle of the do_cmd).

The DMA commands on the heap are enqueued to the appropriate port command queue by the do_cmd for execution when the barrier operation is reached. It is envisioned that among other purposes the commands on the heap will include commands to notify other relevant processes about the synchronization status. For example, the commands may include send event commands to notify parent tasks in a process hierarchy of a distributed application, thereby informing the parent tasks that children tasks have performed their work and reached a synchronization point in their execution. The send_event commands would cause an enq_direct or enq_response packet to be sent to each relevant process at each relevant node. The payload of the packet would be stored on the event queue of the process, and would signal that synchronization has occurred.

As another example, synchronization similar to multicast may be done in the following manner. First, a list of commands is created and associated with the do_cmd. This list could include a list of send_cmd commands. Each of these send_cmds, as described above, has a nested command, which in this case would be a do_cmd (with an associated counter etc.). Therefore when the list of associated commands are executed by the DMA engine, they will cause a do_cmd to be sent to other nodes. These do_cmd commands will be enqueued for execution at the remote node. The multicast use of do_cmd will be performed with the counter equal to zero.

Multicast occurs when some or all of these do_cmds being enqueued for execution at a remote node, point to more send_cmd commands on the heap. This causes the DMA engine to send out yet more do_cmd to other remote nodes. The result, is an "avalanche process" that notifies every process within an application that synchronization has been completed. Because the avalanche occurs in parallel on many nodes, it completes much faster than could be accomplished by the master node alone. Commands can be placed on the heap of a remote node using the put_im_hp command described earlier. This command can be used to set up the notification process.

For example, assume there are 81 processes participating in a barrier operation. The first node can execute four send_cmds and a send_event (for the local process) upon execution of the final do_cmd (5 nodes notified now). Each send_cmd has a payload of a do_cmd. Therefore 4 remote nodes receive and execute a do_cmd that causes them to each send out four more do_cmds, as well as a send_event to the local process. This means 16 nodes have been notified in this step. In total, 21 nodes are now notified. When each of those 16 nodes sends 4 send_events, 64 more nodes are notified, and a total of 81 nodes have been notified. The notification process is now complete.

Overview of the Cache System

Preferred embodiments of the invention may use a cache system like that described in the related and incorporated patent application entitled "System and Method of Multi-Core Cache Coherency," U.S. Ser. No. 11/335,421. This cache, among other things, is a write back cache. Instructions or data may reside in a particular cache block for a processor, e.g., 120 of FIG. 5, and not in any other cache or main memory 550.

In certain embodiments, when a processor, e.g., 502, issues a memory request, the request goes to its corresponding cache subsystem, e.g., in group 542. The cache subsystem checks if the request hits into the processor-side cache. In certain embodiments, in conjunction with determining whether the corresponding cache 542 can service the request, the memory transaction is forwarded via memory bus or cache switch 526 to a memory subsystem 550 corresponding to the memory address of the request. The request also carries instructions from the processor cache 542 to the memory controllers 528 or 530, indicating which "way" of the processor cache is to be replaced.

If the request "hits" into the processor-side cache subsystem 542, then the request is serviced by that cache subsystem, for example by supplying to the processor 502 the data in a corresponding entry of the cache data memory. In certain embodiments, the memory transaction sent to the memory subsystem 550 is aborted or never initiated in this case. In the event that the request misses the processor-side cache subsystem 542, the memory subsystem 550 will continue with its processing and eventually supply the data to the processor.

The DMA engine 540 of certain embodiments includes a cache interface 618 to access the processors' cache memories 542. Therefore, when servicing a RDMA read or write request, the DMA engine can read or write to the proper part of the cache memory using cache interface 618 to access cache switch 526, which is able to interface with L2 caches 542. Through these interfaces the DMA engine is able to read or write any cache block in the virtually same way as a processor.

Figure 9:
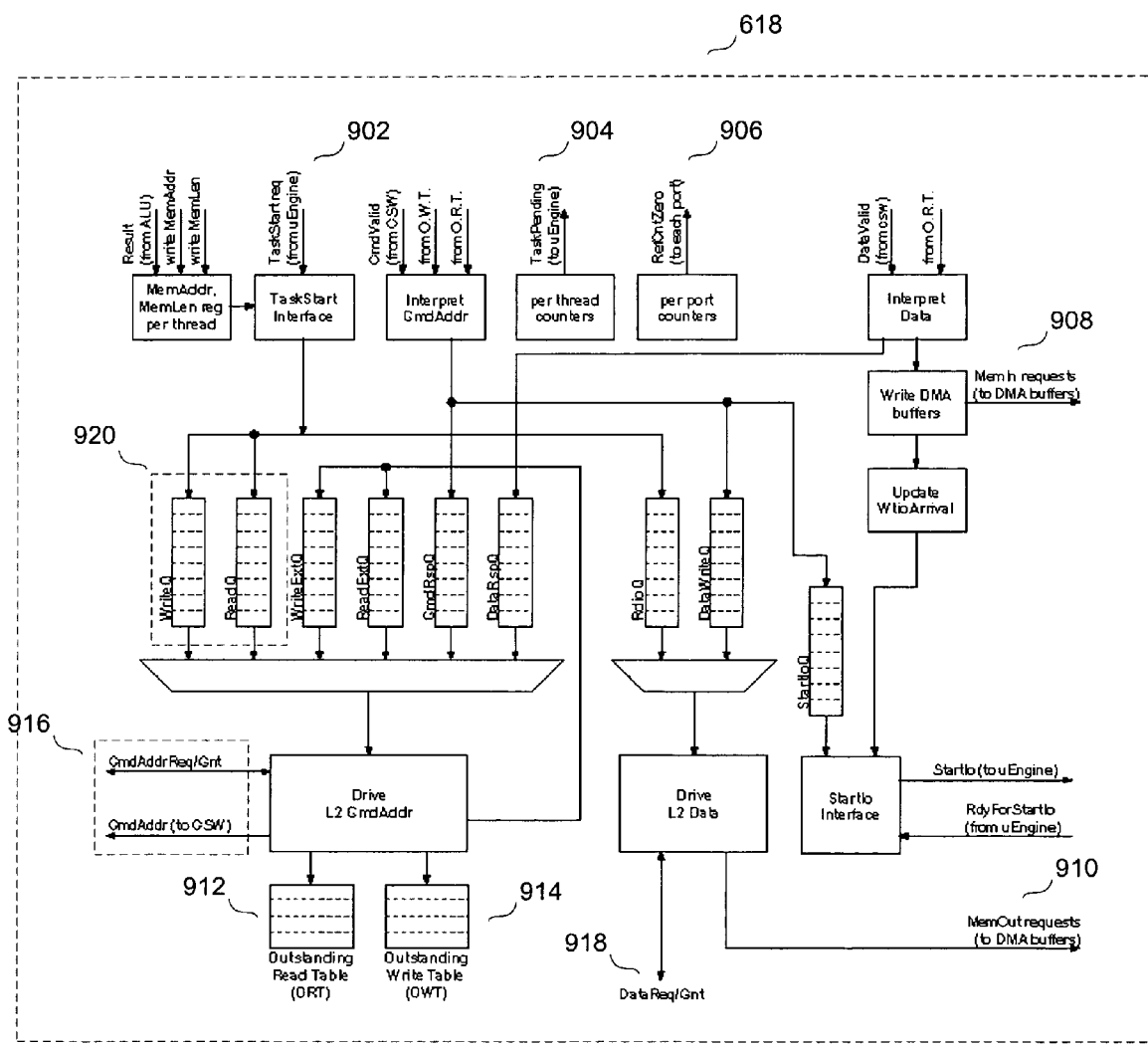
FIG. 9 is a block diagram of the DMA engine's cache interface.

Details of the RDMA engine's cache interface 618 are shown in FIG. 9. The cache interface has an interface 902 for starting tasks, and read and write queues 920. The cache interface also has data bus 918 and command bus 916 for interfacing with cache switch 526, and MemIn interface 908 and MemOut interface 910 for connecting to memory buffers. The cache interface also has outstanding read table 912 and outstanding write table 914, and per thread counters 904 and per port counters 906.

Each microengine thread can start memory transfers or "tasks" via the TaskStart interface 902 to the cache interface. The TaskStart interface 902 is used for interfacing with the DMA engine/microengine 616. The TaskStart interface determines the memory address and length of a transfer by copying the MemAddr and MemLen register values from the requesting microengine thread.

Tasks are placed in queues where they wait for their turn to use the Cmdaddr 916 or data 918 buses. The CmdAddr 916 and data buses 918 connect the DMA engine's cache interface to the cache switch 526. The cache switch is connected to the cache memory 542 and the cache coherence and memory controllers 528 and 530.

The memory transfers move data between main memory and the TX, RX, and copy port buffers in the DMA engine by driving the MemIn 908 and MemOut 910 interfaces. The MemIn 908 controls moving data from main memory or the caches into the DMA engine, and the MemOut 910 interface controls moving data from the DMA buffers out to main memory or the caches.

The cache interface 618 maintains queues for outstanding read 912 and write 914 requests. The cache interface also maintains per-thread 904 and per-port 906 counters to keep track of how many requests are waiting in queues or outstanding read/write tables. In this way, the cache interface can notify entities when the requests are finished.

The cache interface can handle different type of requests: two of these request types are the block read (BRD) and block write (BWT). A block read request received by the DMA microengine is placed in a ReadWriteQ 920. The request cannot leave the queue until an entry is available in the outstanding read table (ORT). The ORT entry contains details of the block read request so that the cache interface knows how to handle the data when it arrives.

Regarding block writes, the microengine drives the TaskStart interface, and the request is placed in ReadWriteQ. The request cannot leave ReadWriteQ until an outstanding write table (OWT) entry is available. When the request comes out of the queue, the cache interface arbitrates for the CmdAddr bus in the appropriate direction and drives a BWT command onto the bus to write the data to main memory. The OWT entry is written with the details of this block write request, so that the cache interface is ready for a "go" (BWTGO) command to write it to memory or a cache when the BWTGO arrives.

The cache interface performs five basic types of memory operations to and from the cache memory: read cache line from memory, write cache line to memory, respond to I/O write from core, respond to SPCL commands from the core, and respond to I/O reads from core. When reading cache lines, the DMA engine arbitrates for and writes to the data bus for one cycle to request data from cache or main memory. The response from the cache switch may come back many cycles later, so the details of that request are stored in the OutstandingReadTable (ORT). When the response arrives on the incoming data bus, the OutstandingReadTable tells where the data should be sent within the DMA engine. When the data is safely in the packet buffer, the ORT entry is freed so that it can be reused. Up to 4 outstanding reads at a time are supported. When writing cache lines, the DMA engine arbitrates for and writes the CmdAddr 916, then when a signal to write the cache data comes back, it reads data from the selected internal memory, then arbitrates for and writes the data bus.

Non-Invalidating Writes to Cache Memory

The cache interface 618 can be used by the DMA engine to directly read and write remote data from processor caches 542 without having to invalidate L2 cache blocks. This avoids requiring processor 502 to encounter a L2 cache miss the first time it wishes to read data supplied by the DMA engine.

For a transfer operation, the process starts with a block read command (BRD) being sent to the cache coherence controller (memory controller or COH) 528 or 530 from the cache interface 618 of the DMA engine 540. The cache tags are then checked to see whether or not the data is resident in processor cache.

If the data is non-resident, the tags will indicate a cache miss. In this case, the request is handled by the memory controller, and after a certain delay, the data is returned to the DMA engine from the main memory (not processor cache). The data is then written to a transmit port by cache interface 618. The data is now stored in a transmit buffer and is ready to be transferred to the link logic and subsequently to another node. If there is an outstanding read or write, then a dependency is set up with the memory controller, so that the outstanding read or write can first complete.

If the data is resident in cache, the L1 cache is flushed to L2 cache memory, and the L2 cache memory supplies the data. A probe read command informs a processor that block read is being done by the DMA engine, and that it should flush its L1 cache. The memory controller includes tag stores (in certain embodiments) to indicate which processor cache holds the relevant data and to cause the probe command to be issued.

FIG. 10 depicts the logic flow when the DMA engine is supplying data to be written into a physical address in memory. In this situation, an RX port writes the incoming DMA data to main memory or, if the addressed block is already in the cache, to the cache. As described above, the DMA engine can write data to main memory once it has received a command and context specifying where data ought to be stored in main memory, e.g., via buffer descriptor tables and the like.

The logic starts at step 1002, in which the DMA engine sends a command, through cache interface 618, to the COH controller asking it to check its cache tags, and providing it the data and physical address for the write. The COH can then pass on the information to the memory controller or L2 cache segment as necessary.

At step 1004, the COH checks the cache tags to determine if there is a cache hit. At this step, the cache coherence controller checks for outstanding read or write operations. In certain embodiments the L2 cache operations may involve multiple bus cycle, therefore logic is provided within the COH for to ensure coherency and ordering for outstanding (in-flight) transactions. The DMA requests conform to this logic similarly to the manner in which processors do. Assume for now that there are no outstanding operations.

If there is no cache hit at step 1004, the method proceeds to step 1016, and the incoming data is sent from the DMA engine to the COH. At step 1018, the COH passes the request to the memory controller, which writes the data to main memory.

If during the check of outstanding write operations, there is a hit, then using the logic with the COH for ordering in-flight operations the current write of data to memory is only done after the outstanding write completes. Similarly, if during the check of the outstanding reads, there is a hit found, then the write waits until the data for the outstanding read has been returned from the main memory. The process then continues similar to writing to a cached block as shown in FIG. 10.

If there is a cache hit at step 1004, then the method proceeds to step 1006, where a block write probe command is issued from the COH to the processor with the cached data, telling it the address of the block write command. The COH has a control structure that allows the COH to determine which processors have a cache block corresponding to the physical memory address of the data being written by the DMA engine. The probe request causes the processor to invalidate the appropriate L1 cache blocks.

At step 1008, the processor invalidates the L1 cache blocks that correspond to the L2 cache blocks being written to. Alternatively, if there is no longer a cache hit, i.e. the block has been evicted, since step 1004, the processor responds to the probe command by telling the DMA engine it should write to the COH (and effectively the main memory).

At step 1010, the DMA engine sends the data to be written to the processor's L2 segment. At step 1012, the processor's L2 segment receives and writes the data to its L2 cache. Finally, at step 1014, the processor informs the COH controller that the write to L2 cache is complete.

Additional steps need to be taken when writing to a cached block as shown in FIG. 10, when there is an outstanding write from another processor. The processor first writes the outstanding write to the COH. The COH then writes the data to the main memory, allowing the write to be completed in the same manner as shown in FIG. 10.

Additional steps also need to be taken if there is an outstanding write to the same address from any source. In this case, then the new incoming write is made dependent upon the outstanding write, and the outstanding write is handled in the same manner as any other write. Once that write is complete, the new incoming write is handled. Additional steps also need to be taken in the above situation if there is an outstanding read.

All the above situations have assumed that the data being written to is in the exclusive state. This means that only a single processor is reading the data. However, data in the caches can also be in a shared state, meaning that data within one cache is shared among multiple processors. To account for the fact that multiple processors may be reading the data when a block write is done, an invalidation probe is sent out to all processors matching the tag for the block. This requests that all processors having the cache block invalidate their copy. Shared data blocks cannot be dirty, so there is no need to write any changes back to main memory. The data can then be written to main memory safely. The other processors that were sharing the data will reload the data from main memory.

Avoiding Page Locking

The DMA engine allows user-level code to use it directly, without requiring system calls or interrupts in the critical path. To accomplish this task for RDMA operations (which copy data in and out of application virtual memory), preferred embodiments of the invention rely on the virtual-to-physical memory associations to (likely) stay intact during the application's lifetime. Preferred embodiments provide logic to recover from the uncommon case where this is not so.

The application software invokes the OS to associate a buffer descriptor index (BDI) with an application virtual address (VA). The OS writes a corresponding entry of the BD table with the physical address (PA) that corresponds to the VA (this association being known to the OS). This validates the BD. In preferred embodiments, only the OS is permitted to write the BDT. In this way applications can only command the DMA to access memory permitted by the OS via its programming of the BDT.

Applications command DMA engine(s) to transfer data, identifying the relevant memory locations via BD indices. Thus, a DMA operation will include a source BD index to specify the location for the source of the data, and a BD index to specify the location for the destination for the data. When the DMA engines are performing a DMA transfer, the source DMA engine will translate the source BD index, and the destination DMA engine (which may be the same) will translate the destination BD index. Each does this by reading the BD value of its respective BDT, which value may reveal the PA or it may reveal the BD is invalid (e.g., in some embodiments this may be indicated by having a zero length for that BD entry). Invalid BDs create a fault condition (which is described further below). Under preferred embodiments, the BD entries correspond to page boundaries of the memory system, and transfers of smaller than a page may be handled by use of offset values.

Figure 11A:
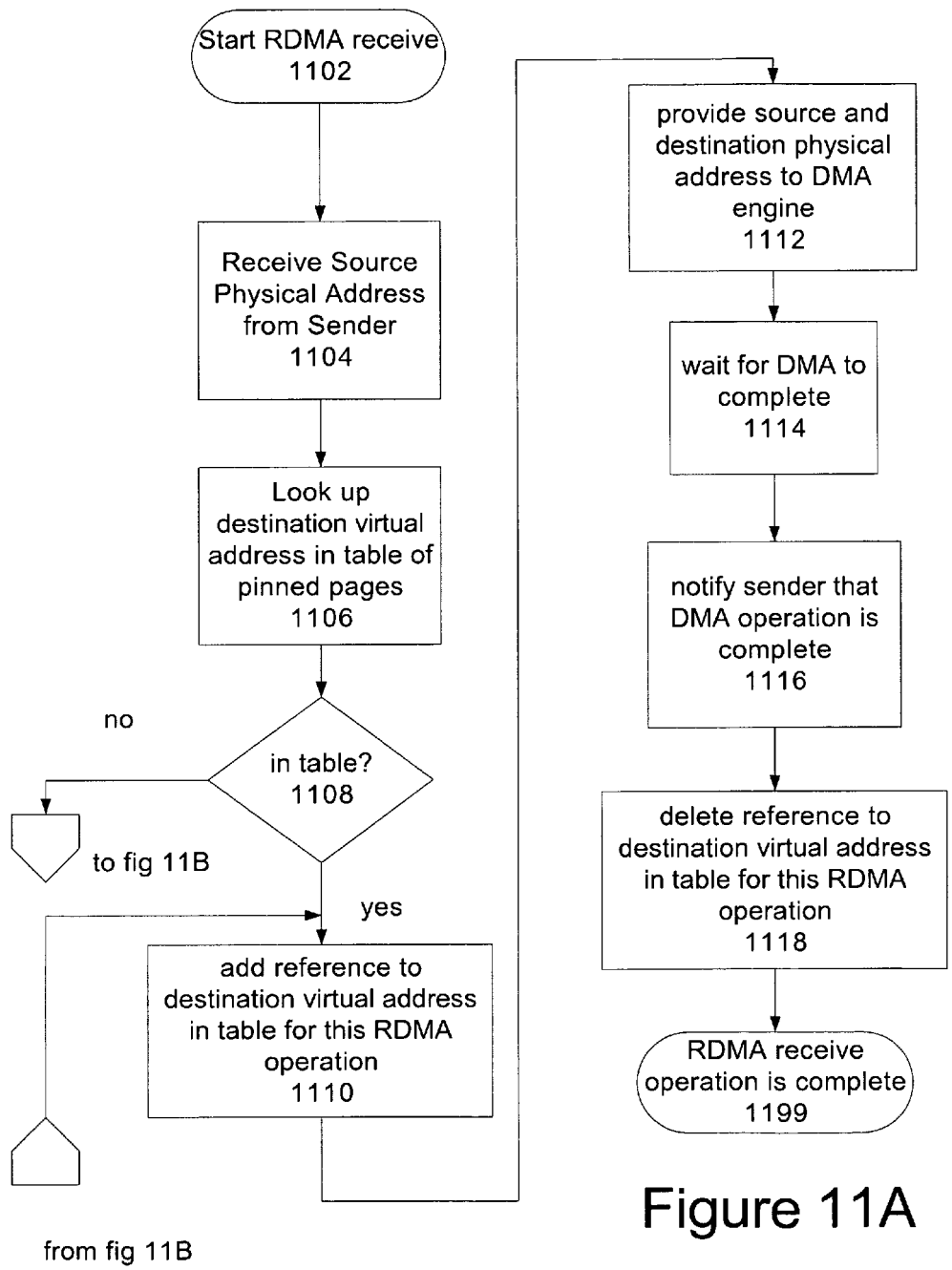
FIGS. 11A-B depict a typical logic flow for RDMA receive operations when page pinning is utilized.
Figure 11B:
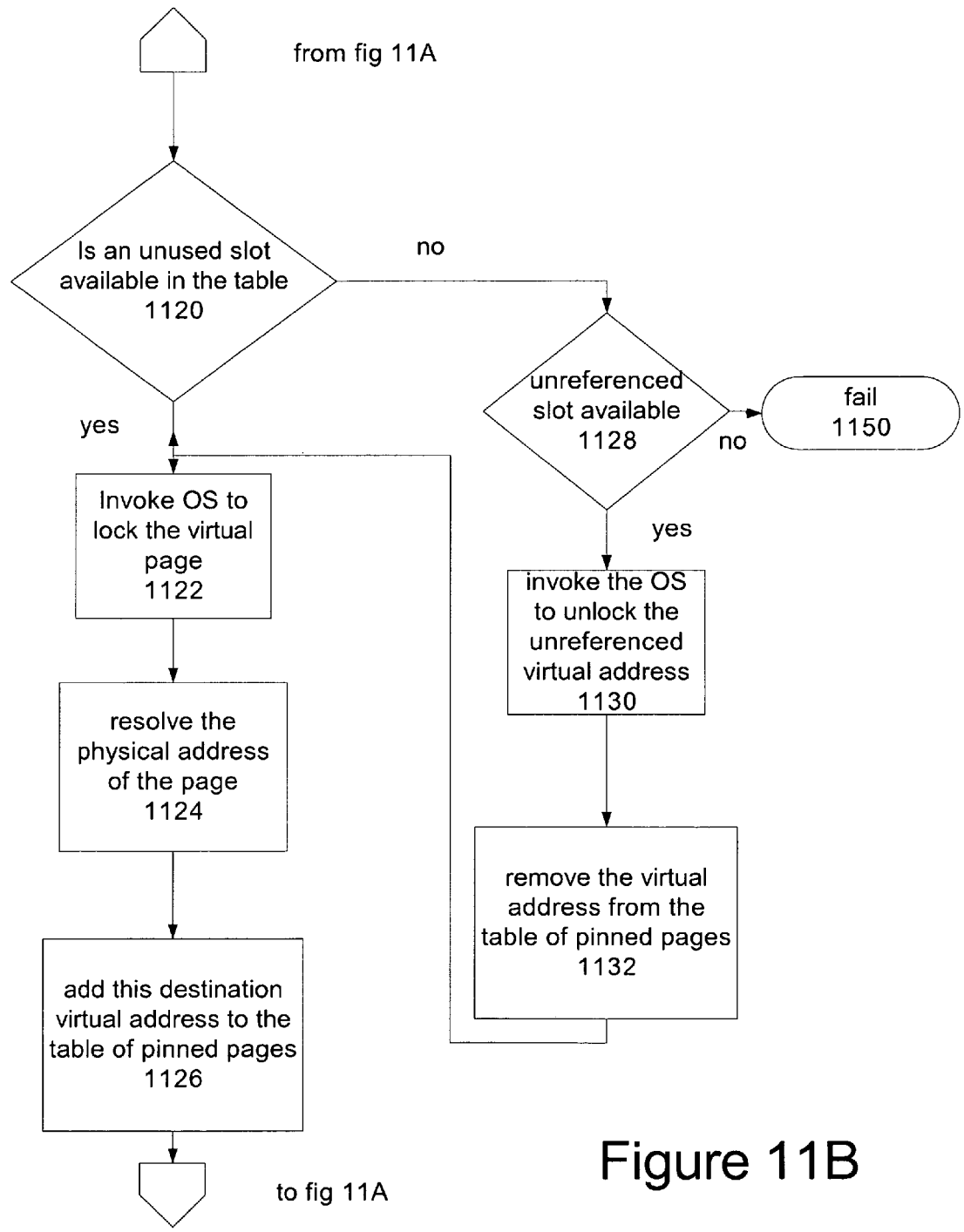

FIGS. 11A-B depict a typical logic flow for RDMA receive operations when page pinning is utilized. The logic begins in 1102 and proceeds to 1104 where the software (e.g., library routine) receives the source physical address from the sender. In 1106, the destination virtual address for the RDMA receive operation is looked up to see if it is present in the OS table of pinned pages. In 1108, a test is made to see if it is present in the table. If so, the logic proceeds to step 1110, where a reference to the destination virtual address is added to the table for this RDMA operation. In 1112, the source and destination physical addresses are provided to the DMA engine, and in 1114 the logic waits for the DMA operation to complete. Once completed, the sender is notified of the completion status in 1116 by the DMA engine (e.g., via the event queue). The reference to the destination virtual address is then deleted from the table in 1118, and the operation completes.

If, however, the test of 1108 determines that the destination virtual address is not in table, then the logic proceeds to 1120. In 1120 a test is made to determine whether or not there is an unused slot available in the table of pinned pages. If so, in 1122 the operating system is invoked to lock the virtual page. The physical address for the destination virtual address is resolved in step 1124 (i.e., the OS provides the corresponding physical page for the destination virtual address), and the destination virtual address is then added to the table of pinned pages in 1126.

If the test of 1120 determines that there is no unused available slot in the table of pinned pages, then in 1128 a test is made to determine whether or nor there is an unreferenced slot available. If so, the OS is invoked to unlock the unreferenced virtual addresses in 1130, and the virtual address is removed from the table of pinned pages in 1132. The logic returns to 1122, now with an available table slot.

If test 1128 determines that there are no unreferenced slots available, the logic fails in 1150.

Figure 12A:
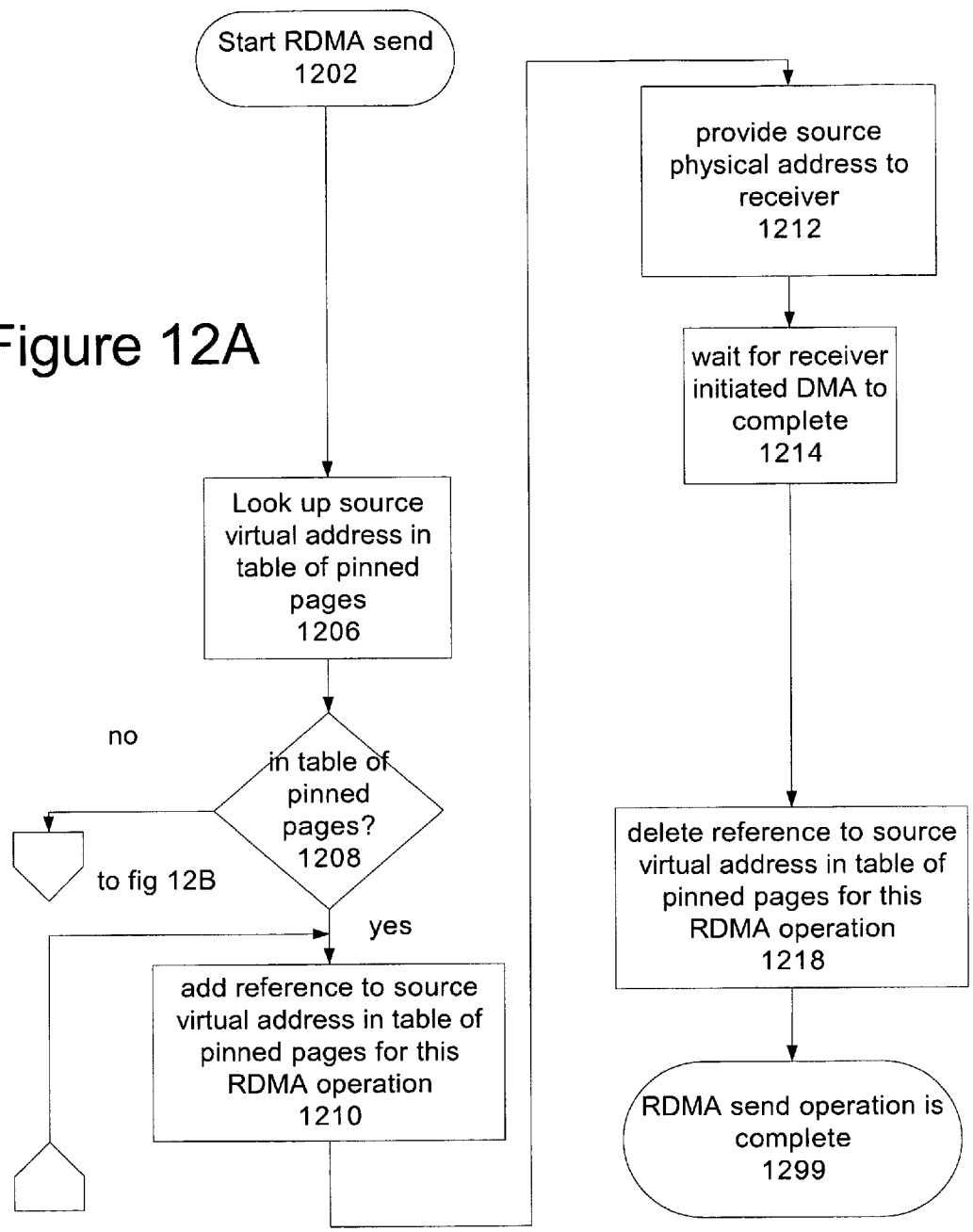
FIGS. 12A-B depict a typical logic flow for RDMA send operations when page pinning is utilized.
Figure 12B:
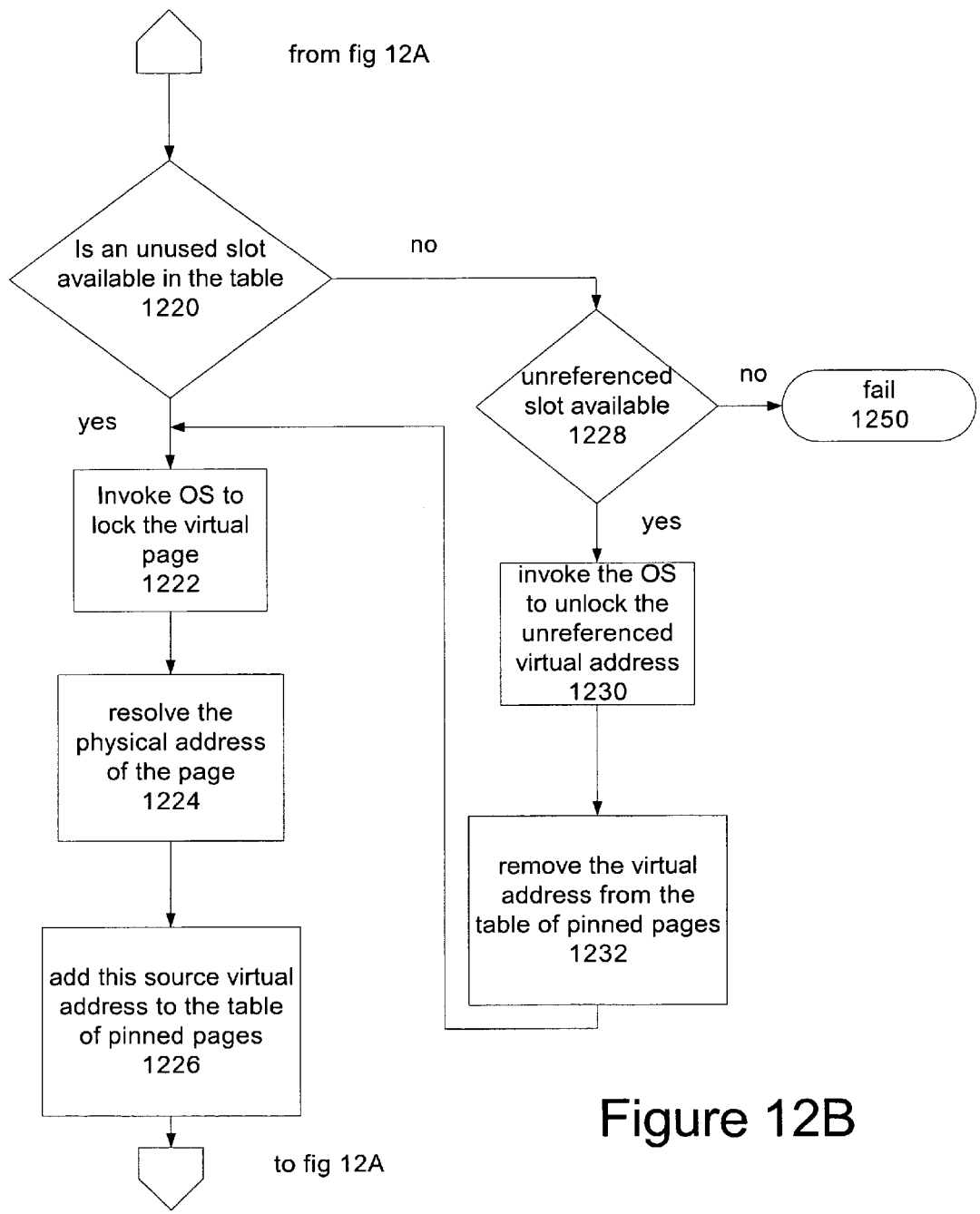
Figure 13A:
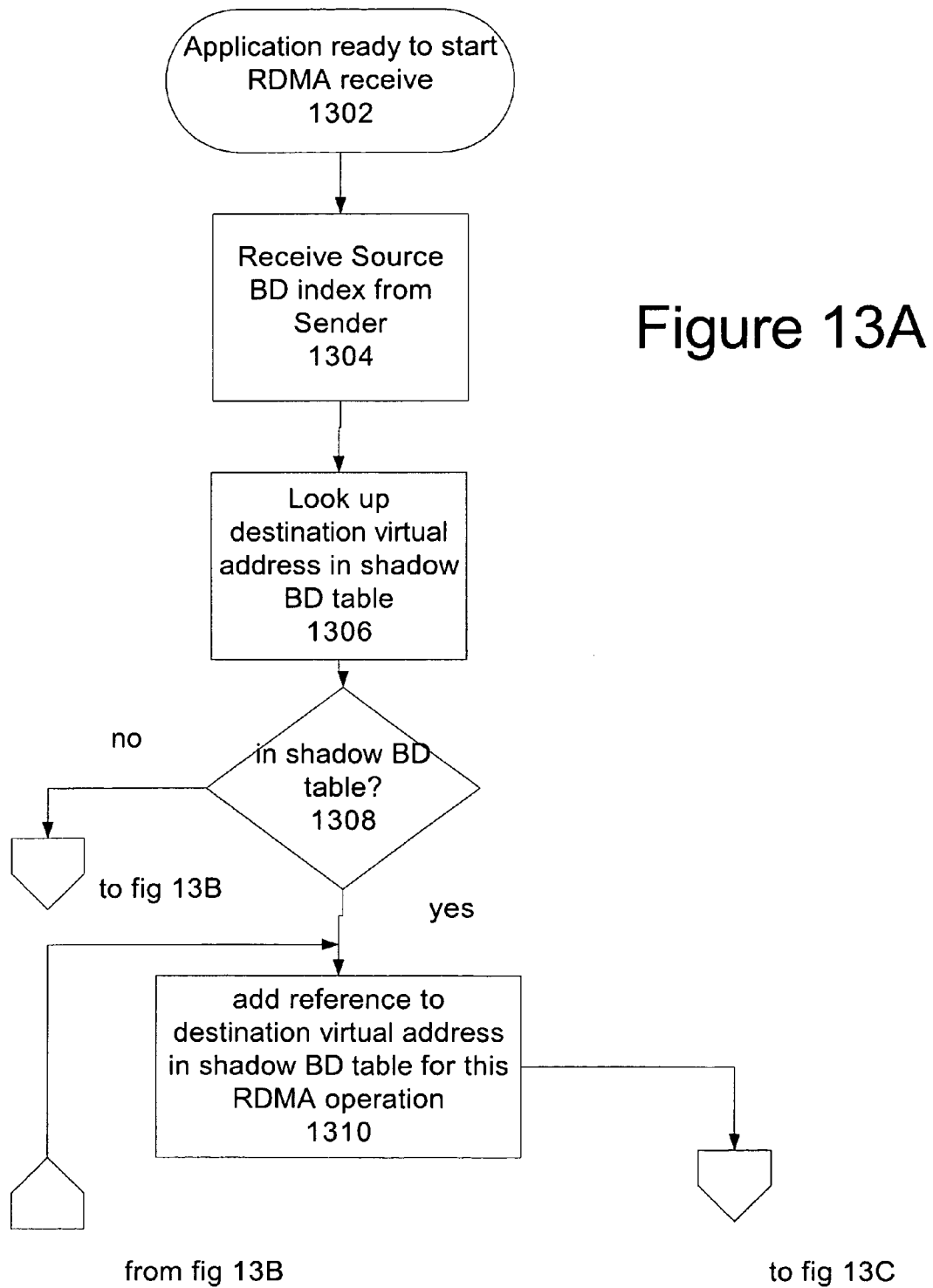
FIGS. 13A-D depict a logic flow for preferred embodiments in which RDMA receive operations avoid page pinning.
Figure 13B:
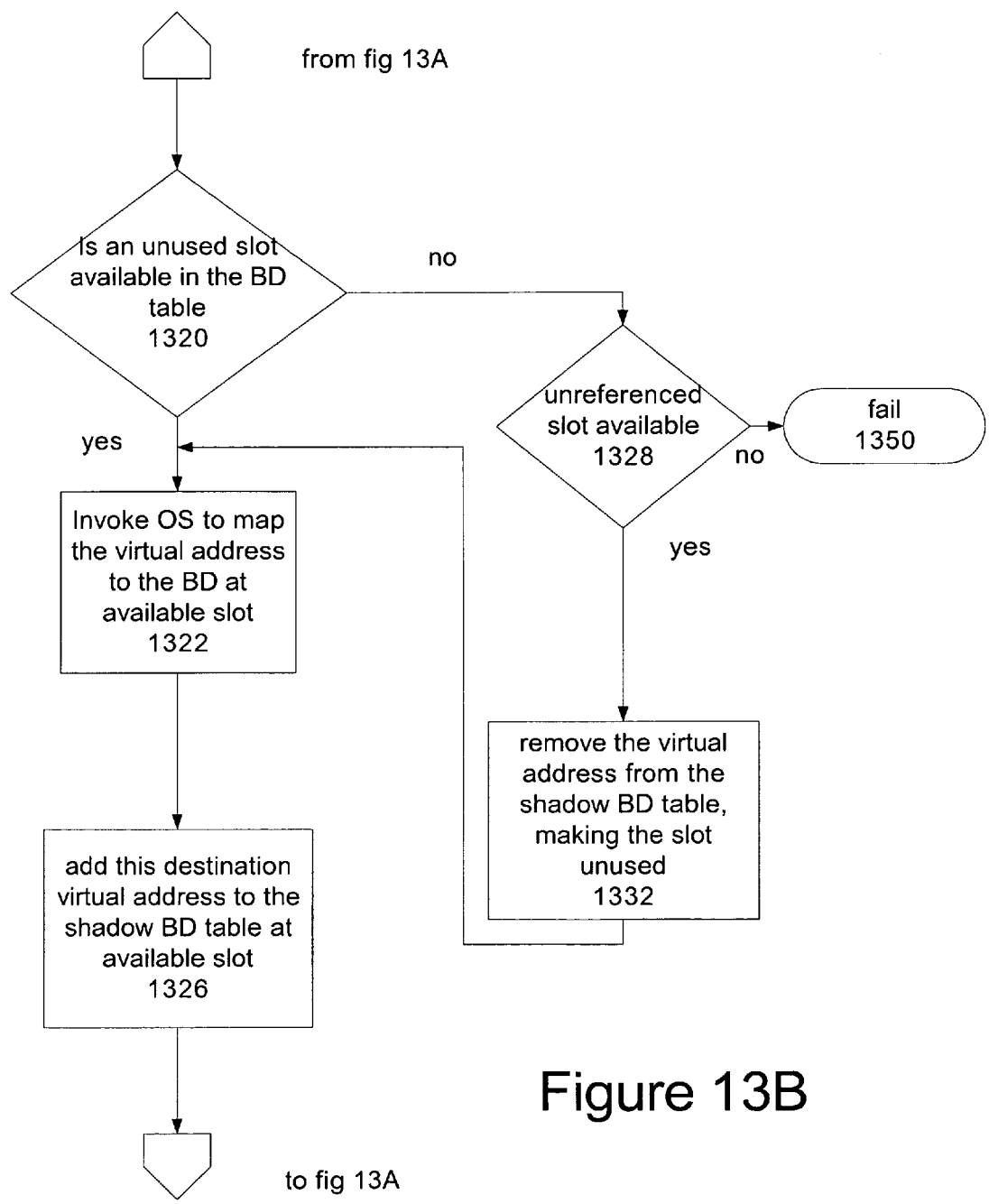
Figure 13C:
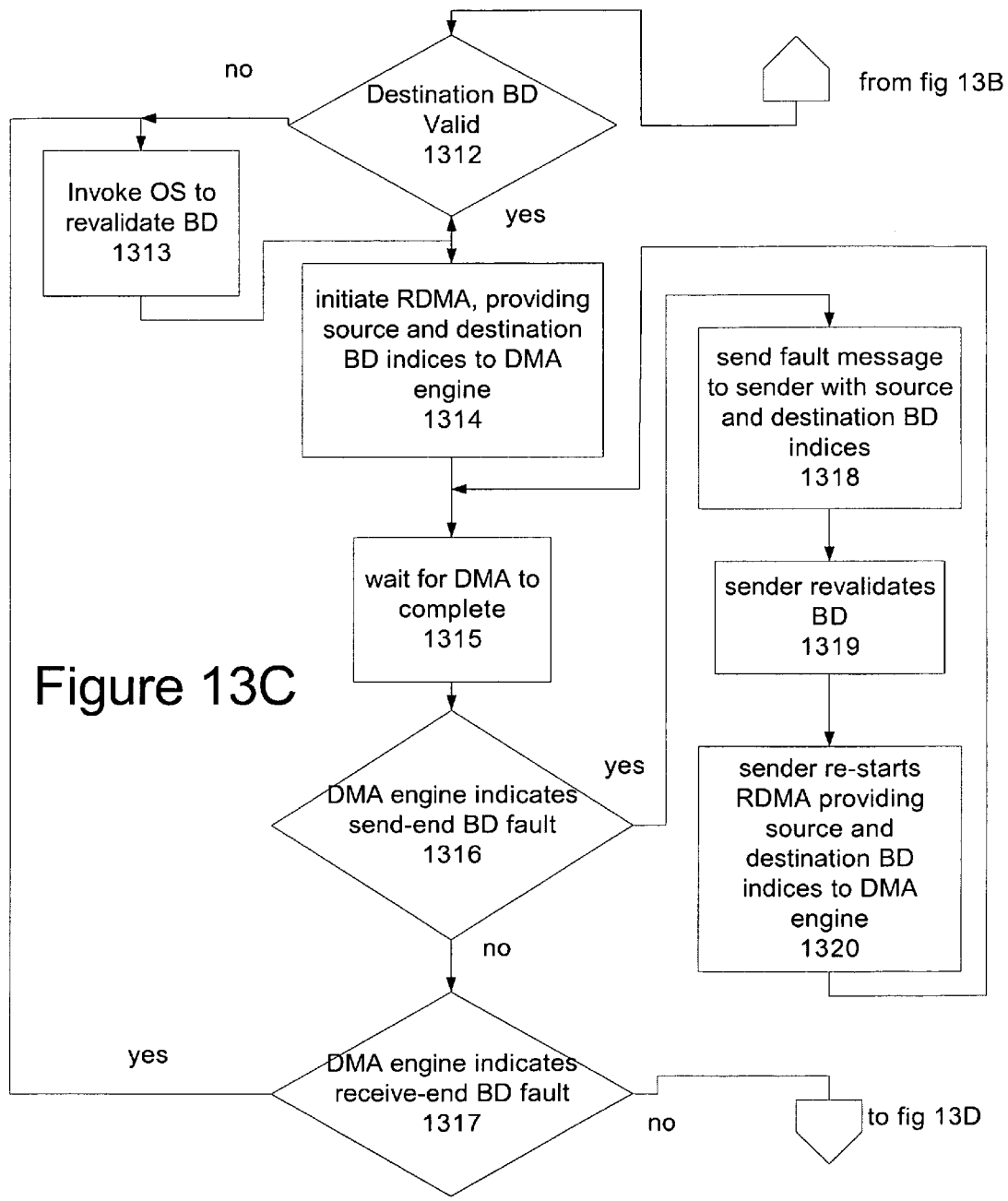
Figure 13D:
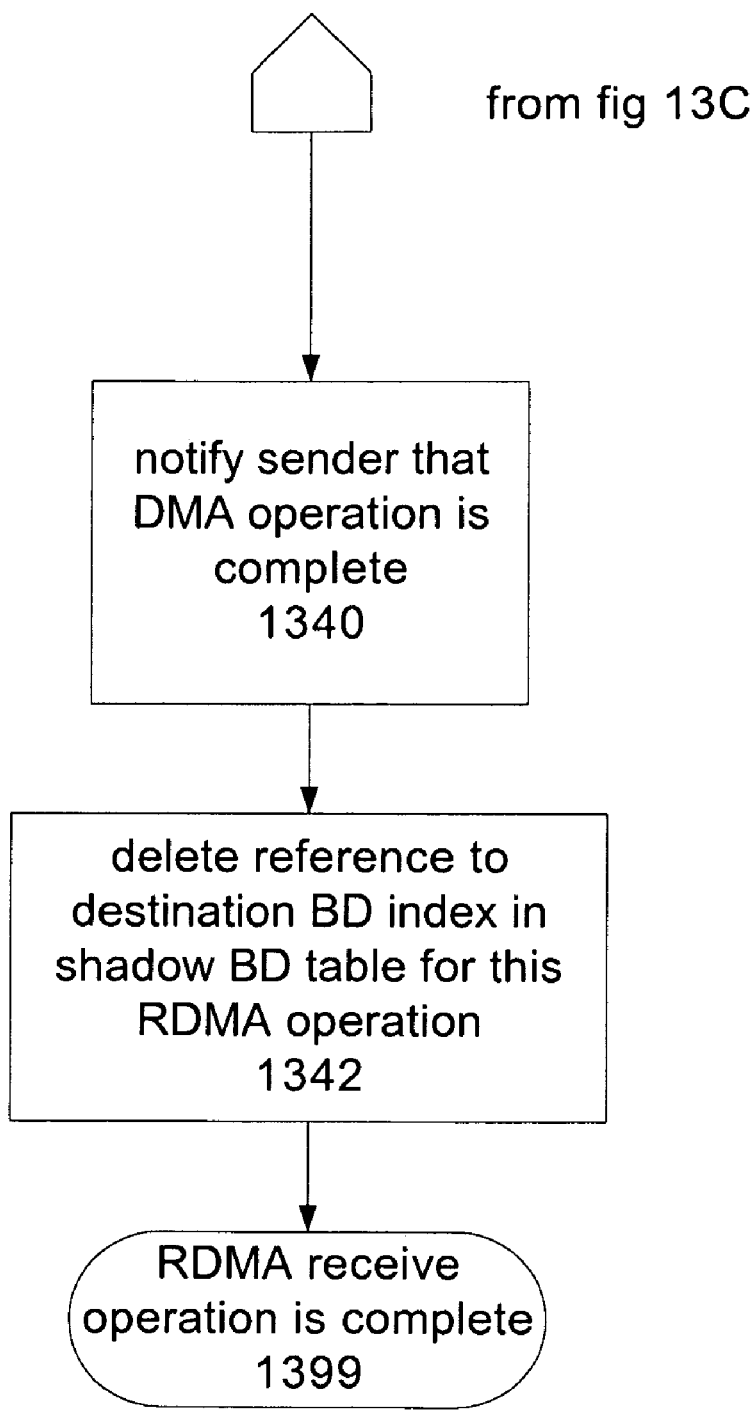
Figure 14A:
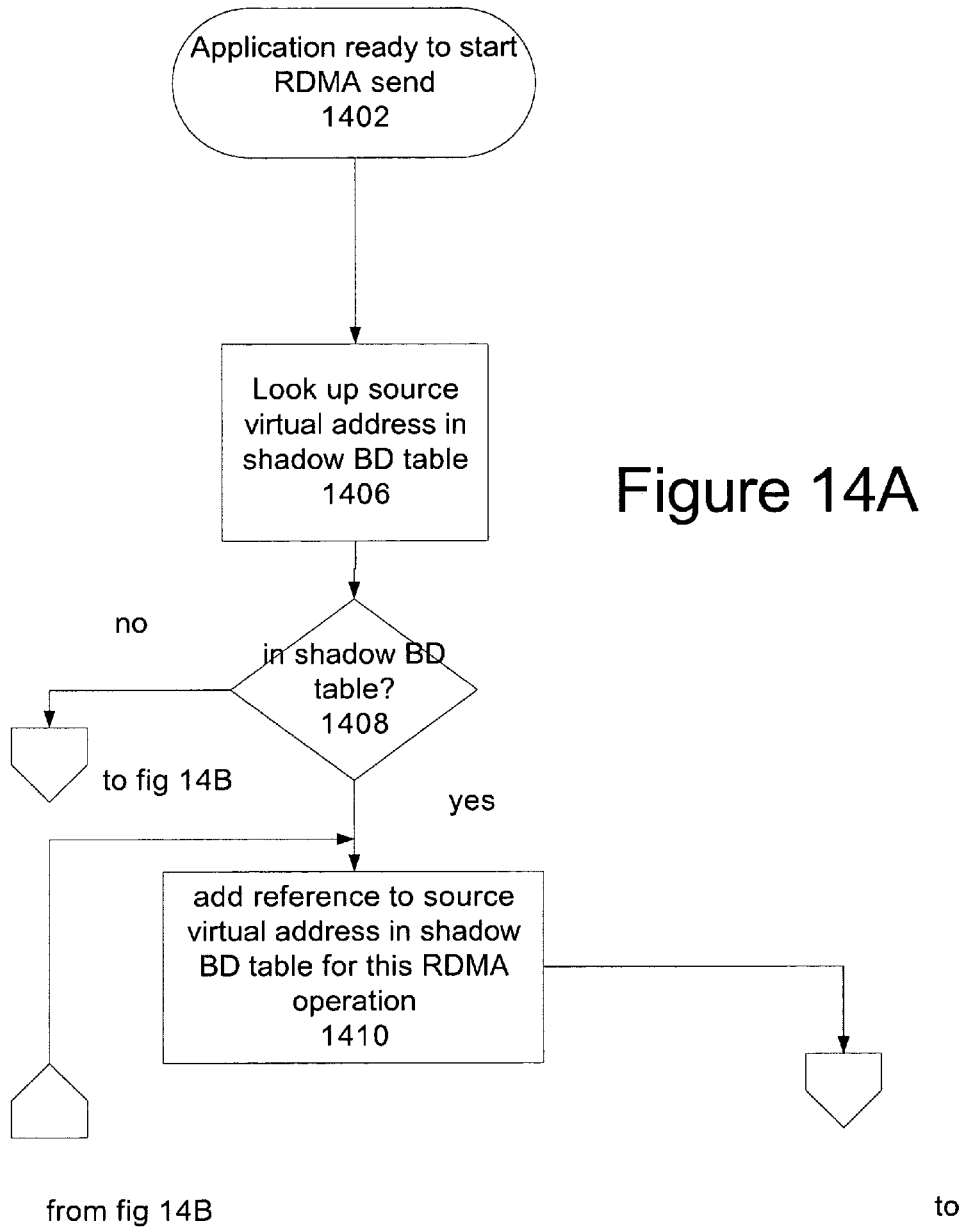
Figure 14C:
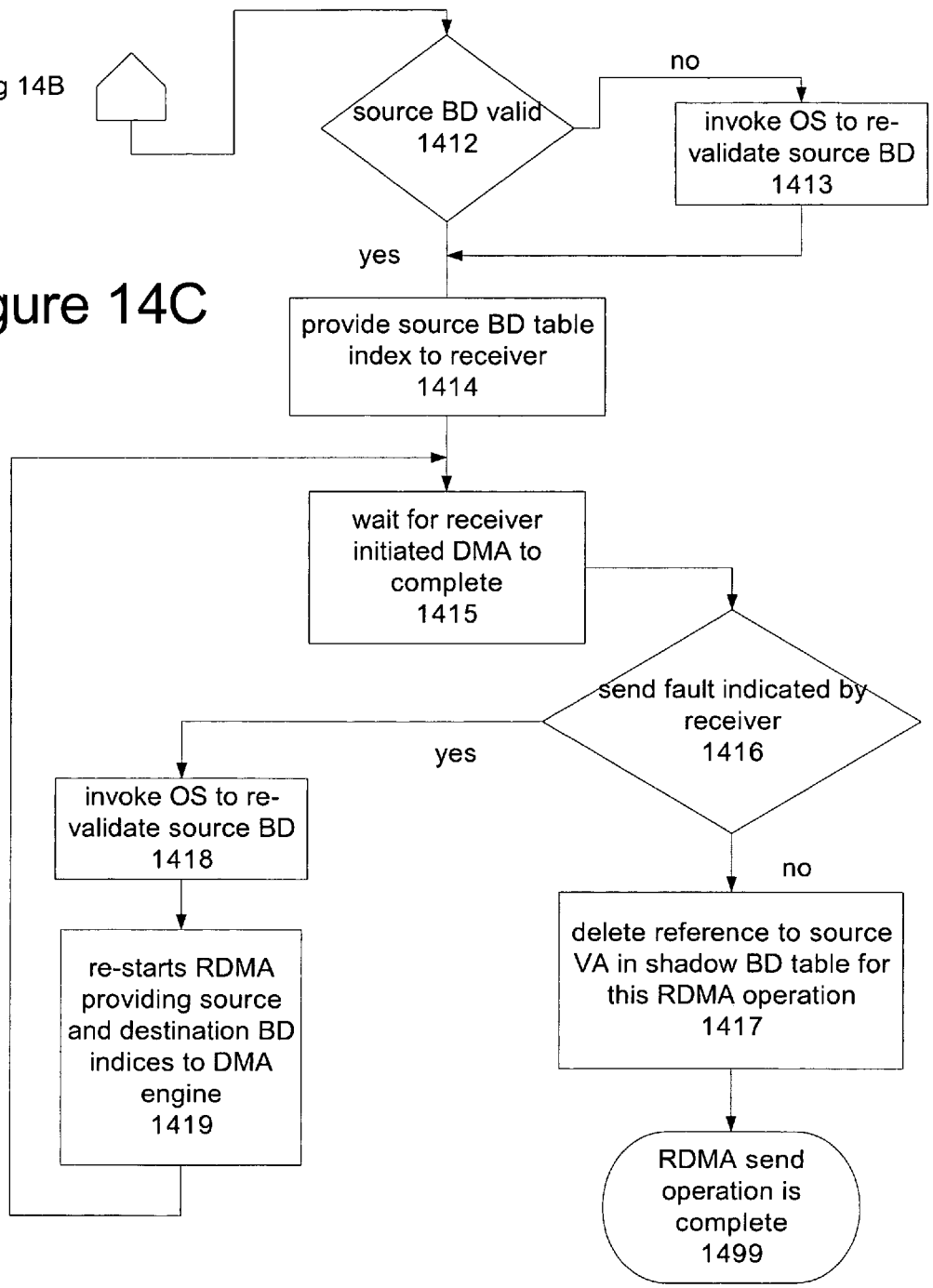

FIGS. 12A-B depict a typical logic flow for RDMA send operations when page pinning is utilized. The logic begins in 1202 and proceeds to 1206, where the source virtual address for the RDMA send operation is looked up to see if it is present in the table of pinned pages (the source virtual address being provided by the caller). In 1208, a test is made to see if it is present in table of pinned pages. If so, the logic proceeds to step 1210, where a reference to the source virtual address is added to the table of pinned pages for this RDMA operation. In 1212, the source physical address is provided to the receiver (as part of a request to the software on the receiving node), and in 1214 the logic waits for the receiver-initiated DMA operation to complete. Once completed, the reference to the source virtual address is then deleted from the table of pinned pages in 1218, and the operation completes.

If, however, the test of 1208 determines that the destination virtual address is not in the table of pinned pages, then the logic proceeds to 1220. In 1220 a test is made to determine whether or not there is an unused slot available in the table. If so, in 1222 the operating system is invoked to lock the virtual page corresponding to the source virtual address. The physical address for the source virtual address is resolved in step 1124, and the source virtual address is then added to the table of pinned pages in 1226.

If the test of 1220 determines that there is no unused slot available in the table of pinned pages, then in 1228 a test is made to determine whether or nor there is an unreferenced slot available. If so, the unreferenced virtual addresses are unlocked in 1230 (i.e., by the OS), and the virtual address is removed from the table of pinned pages in 1232. The logic returns to 1222, now with an available table slot.

If test 1228 determines that there are no unreferenced slots available, the logic fails in 1250.

FIGS. 13A-D depict a logic flow for preferred embodiments in which RDMA receive operations avoid page pinning. As a general matter, all operations are performed by unprivileged software (e.g., application or library software) without invoking the OS kernel unless otherwise indicated. The logic begins in 1302 in which the application is ready to start an RDMA receive operation. The logic proceeds to 1304 where the source BD index is received from the sender (i.e., the entity that will transfer data to the receiving node). In 1306, the destination virtual address is looked up to see if it is present in a shadow BD table. (The shadow BD table is a data structure maintained by unprivileged application software—not the operating system as is the case for the normal BD table—and the entries correspond to the normal BD table and contain additional information, including the corresponding virtual address and reference counts; They are used so that the application software can track its BD mappings.) In other embodiments shadow BDs are not needed. In 1308, a test is made to see if it is present in the shadow BD table. If so, the logic proceeds to step 1310, where a reference to the destination virtual address is added to the shadow BD table for this RDMA operation. In 1312, a test is made to determine whether or not the buffer descriptor for the destination is valid. If not, in 1313 the OS is invoked to revalidate the buffer descriptor (more below, see FIG. 15). (In some embodiments 1312 and 1313 may be omitted.) In 1314, the RDMA transaction is initiated by providing the DMA engine with the BD indices for both the source and destination. In 1315, the logic waits for the DMA operation to complete. Once completed, a test is made in 1316 to determine whether or not the DMA engine indicates a BD fault from the sender end (i.e., the other node that will be transferring the data to the receiving DMA engine/node). For example, if the BD is invalid at the sender, a BD fault is indicated by an event sent to the receiver. If there is no such fault indicated, in 1317 a test is made to determine whether or not a BD fault was indicated at the receiver end, when processing the operation. If no such fault was indicated the logic proceeds to 1340 where the sender is notified of the successful completion status. The reference to the destination virtual address is then deleted from the shadow BD table in 1342, and the operation completes.

If, however, the test of 1316 determines that there is a BD fault from the sender end, the logic proceeds to 1318 where a fault message is sent to the sender (i.e., the entity transferring data) containing the BD indices of the source and destination. In 1319, the sender revalidates the relevant BD, and in 1320 the sender re-starts the RDMA receive operation. The logic then proceeds to 1315 and proceeds as described above.

If the test of 1317 determines that there is a BD fault from the receive end, the logic proceeds to 1313 and proceeds as described above.

If the test of 1308 determines that the destination virtual address is not in shadow BD table, then the logic proceeds to 1320. In 1320 a test is made to determine whether or not there is an unused BD slot available. If so, in 1322 the operating system is invoked to map the virtual address of the BD at the available slot. The destination virtual address is then added to the shadow BD table in 1326, and the logic process to 1310, described above.

If the test of 1320 determines that there is no unused slot available in the BD table, then in 1328 a test is made to determine whether or nor there is an unreferenced slot available in the shadow BD table. If so, the virtual address is removed from the shadow BD table in 1332. The logic returns to 1322, now with an available BD slot.

If test 1328 determines that there are no unreferenced slots available, the logic fails in 1350.

FIGS. 14A-D depict a logic flow for preferred embodiments in which RDMA send operations avoid page pinning. The logic begins in 1402 in which the application is ready to start an RDMA send operation. The logic proceeds to 1406, in which the source virtual address is looked up to see if it is present in the shadow BD table. In 1408, a test is made to see if it is present in the shadow table. If so, the logic proceeds to step 1410, where a reference to the source virtual address is added to the shadow BD table for this RDMA operation. In 1412, a test is made to determine whether or not the buffer descriptor for the source is valid. If not, in 1413 the OS is invoked to revalidate the source buffer descriptor. In 1414, the source BD table index is provided to the receiver. In 1415, the logic waits for the DMA operation to complete. Once completed, a test is made in 1416 to determine whether or not a fault is indicated by the receiver end. If there is no such fault indicated, in 1417 the reference to the source virtual address is then deleted from the shadow BD table, and the operation completes.

If, however, the test of 1416 determines that there is a fault from the receive end, the logic proceeds to 1418 where the OS is invoked to revalidate the source BD. In 1419 the RDMA is restarted providing the source and destination BD indices to the DMA engine. The logic proceeds to 1415 and proceeds as described above.

If the test of 1408 determines that the source virtual address is not in shadow BD table, then the logic proceeds to 1420. In 1420 a test is made to determine whether or not there is an unused BD slot available. If so, in 1422 the operating system is invoked to map the virtual address of the BD at the available slot. The source virtual address is then added to the shadow BD table in 1426.

If the test of 1420 determines that there is no unused slot available in the BD table, then in 1428 a test is made to determine whether or nor there is an unreferenced slot available. If so, the virtual address is removed from the shadow BD table in 1432. The logic returns to 1422, now with an available BD slot.

If test 1428 determines that there are no unreferenced slots available, the logic fails in 1450.

FIG. 15 depicts the operating system logic for mapping or re-validating a BD, for example as called for in 1313 etc. (For example, the operating system will be invoked by the application in response to a BD fault, or if the application determines that the BD is invalid prior to initiating to a DMA operation, or if the application is newly mapping a BD prior to initiating a DMA operation.) The logic begins in 1502 where the application requests to map or re-validate a BD, specifying the BD index and relevant virtual address. In 1504 a test is made to determine whether or not the virtual address is valid. If not, the request is denied in 1512. If the VA is valid, another test is performed in 1506 to determine whether or not the BD index is valid. If no the request is denied in 1514. If so, the logic proceed to 1507 where a test is performed to determine whether or not the VA is mapped to a corresponding PA. If it is, the logic proceed to 1508, where the virtual address is resolved to provide the corresponding physical address. In 1510 the BD is written, with the physical address being encoded. The logic ends in 1599.

If, however, the test of 1507 determines that the VA is not mapped to a PA, the logic proceeds to 1550, where an invalid BD value is written. This is done because the VA is valid, but there is no corresponding page.

In some embodiments, when recovering from a BD fault (at the sender or receiver end), the application will perform a memory operation that references the relevant virtual address. This will cause the OS to create a mapping between the VA and a PA. For example, this may occur prior to step 1418 and other steps like that.

Figure 16A:
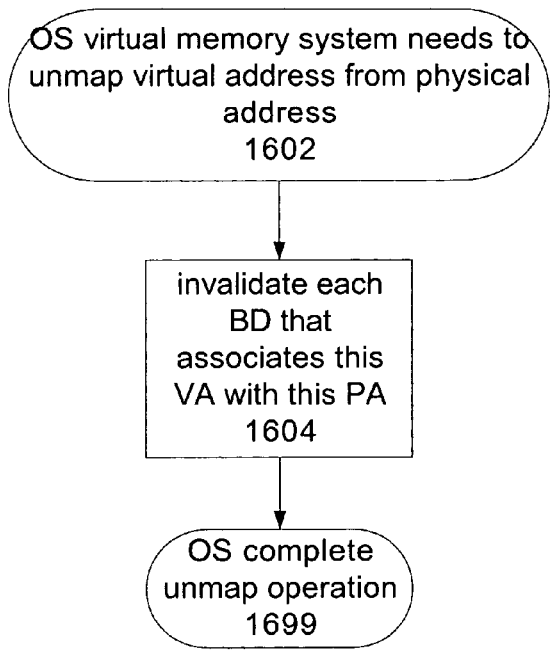
FIG. 16A depicts the logic for maintaining buffer descriptors when unmapping a virtual address of certain embodiments.

FIG. 16A depicts the logic for maintaining buffer descriptors when unmapping a virtual address (e.g., when swapping out pages, or an application indicating it no longer needs the pages). The logic begins in 1602 and proceeds to 1604 in which each BD is invalidated that is mapped to the physical address no longer needed. The logic ends in 1699.

Figure 16B:
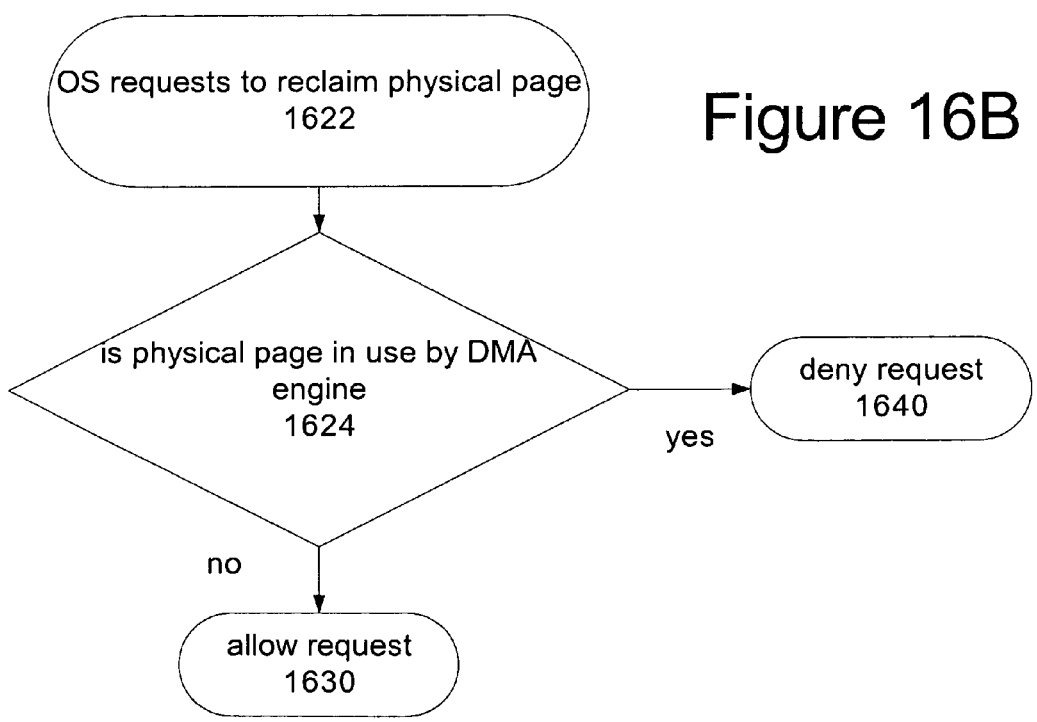
FIG. 16B depicts the logic for reclaiming physical pages of certain embodiments.

FIG. 16B depicts the logic for reclaiming a physical page. The logic begins in 1622 and proceeds to 1624 where a test is made to determine whether or not the physical page is in use by the DMA engine. If it is in use, the request is denied in 1640. If it is not in use, the request is allowed in 1630. Thus, memory management software will consider whether a physical page is being used by a DMA engine before using it for another purpose. The OS in fact may use that page but part of its selection logic will consider whether the page is in use by DMA. Unlike the prior art which requires software to guarantee that physical pages be present for an operation (i.e., by page pinning and corresponding loss of flexibility), preferred embodiments do not guarantee page presence. Instead, preferred embodiments allow the RDMA operation to fail if the OS has unmapped physical pages, and allows the software to recover from that failure and restart the RDMA operation. This provides an efficient RDMA operation which does not incur the cost of invoking the OS in typical transactions. It also increases the flexibility for paging software by not requiring pinned pages for the DMA operations.

While the invention has been described in connection with certain preferred embodiments, it will be understood that it is not intended to limit the invention to those particular embodiments. On the contrary, it is intended to cover all alternatives, modifications and equivalents as may be included in the appended claims. Some specific figures and source code languages are mentioned, but it is to be understood that such figures and languages are, however, given as examples only and are not intended to limit the scope of this invention in any manner.

What is claimed is:

1. In a multi-node computer system having a plurality of interconnected processing nodes, a method of using DMA engines without page locking by an operating system, the method comprising:

a receiving node using an operating system to associate its physical memory locations with corresponding virtual memory addresses, wherein at least one portion of said physical memory is associated with corresponding virtual memory addresses without utilizing operating system page lock controls, thereby permitting the operating system to swap out the content of said at least one portion of said physical memory so that the operating system may re-allocate that physical memory for another use;

performing a DMA data transfer operation between a first virtual address space on a sending node and a second virtual address space on the receiving node via a DMA engine;

when performing the DMA operation, involving virtual addresses at the receiving node corresponding to the at least one portion of physical memory lacking page lock controls, for determining whether the DMA operation refers to a virtual address within the second virtual address space on the receiving node that is present in physical and that has not been swapped out of physical memory;

if the DMA operation refers to a virtual address within the second virtual address space that is not in physical memory, causing the DMA operation to fail;

if the DMA operation refers to a virtual address within the second virtual address space that is not in physical memory, causing the receiving node to map the referenced virtual address within the second virtual address space to a physical address; and causing the sending node to retry the DMA operation, wherein the retried DMA operation is performed without page locking on the receiving node.

2. The method of claim 1, wherein the sending node and the receiving node are remote from each other, and wherein the sending node and the receiving node are connected through a communication fabric with a predefined topology.

3. The method of claim 2, wherein the predefined topology is a Kautz topology.

4. The method of claim 1, wherein determining whether the DMA operation refers to a virtual address within the second virtual address space on the receiving node that is present in physical memory comprises checking at least one of a pinned page table and a buffer descriptor table.

5. The method of claim 1, where causing the receiving node to map the referenced virtual address within the second virtual address space to a physical address comprises resolving the virtual address to a corresponding physical address, and adding the physical address to at least one of the pinned page table and the buffer descriptor table on the receiving node.

6. The method of claim 1, wherein causing the causing the DMA operation to fail comprises the sending of a fault signal from the receiving node to the sending node.

* * * * *